(12) United States Patent
Tomioka et al.

(10) Patent No.: US 6,719,420 B2
(45) Date of Patent: Apr. 13, 2004

(54) LIQUID COMPOSITION, INK SET, METHOD FOR FORMING COLORED PORTION ON RECORDING MEDIUM, AND INK-JET RECORDING APPARATUS

(75) Inventors: Hiroshi Tomioka, Tokyo (JP); Yutaka Kurabayashi, Tokyo (JP); Masao Kato, Tochigi (JP); Makiko Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/138,295

(22) Filed: May 6, 2002

(65) Prior Publication Data

US 2003/0103121 A1 Jun. 5, 2003

(30) Foreign Application Priority Data

May 10, 2001 (JP) ........................................ 2001-140442

(51) Int. Cl.[7] ................................................. B41J 2/01
(52) U.S. Cl. ....................... 347/100; 347/96; 106/31.13
(58) Field of Search ............................ 347/100, 96, 95, 347/101; 106/31.13, 31.6, 31.27

(56) References Cited

U.S. PATENT DOCUMENTS

| | | | |
|---|---|---|---|
| 4,202,870 A | 5/1980 | Weber et al. | ................ 423/630 |
| 4,242,271 A | 12/1980 | Weber et al. | ......... 260/448 AD |
| 4,433,048 A | 2/1984 | Solberg et al. | ............. 430/434 |
| 4,694,302 A | 9/1987 | Hackleman et al. | |
| 4,723,129 A | 2/1988 | Endo et al. | |
| 5,549,740 A | 8/1996 | Takahashi et al. | ............. 106/20 |
| 5,618,338 A | 4/1997 | Kurabayashi et al. | ...... 106/26 R |
| 5,640,187 A | 6/1997 | Kashiwazaki et al. | ....... 347/101 |
| 5,792,249 A | 8/1998 | Shirota et al. | ............ 106/31.27 |
| 5,835,116 A | 11/1998 | Sato et al. | ...................... 347/98 |
| 5,985,975 A | 11/1999 | Kurabayashi et al. | ........ 524/462 |
| 6,027,210 A | 2/2000 | Kurabayashi et al. | ........ 347/100 |
| 6,238,045 B1 | 5/2001 | Ono et al. | ...................... 347/96 |
| 6,460,989 B1 | 10/2002 | Yano et al. | .................. 347/101 |

FOREIGN PATENT DOCUMENTS

| | | | | |
|---|---|---|---|---|
| EP | 0965460 A2 | * | 12/1999 | ............ B41M/5/00 |
| EP | 0 965 460 A2 | | 12/1999 | |
| EP | 1099732 A1 | * | 5/2001 | ............ C09D/11/00 |
| EP | 1106658 A2 | * | 6/2001 | ............... B41J/2/01 |
| EP | 1 106 658 A2 | | 6/2001 | |
| EP | 1197533 A1 | * | 4/2002 | ............ C09D/11/00 |

(List continued on next page.)

OTHER PUBLICATIONS

Barrett et al., The Journal of the American Chemical Society, "The Determination of Pore Volume and Area Distributions in Porous Substances. I. Computations from Nitrogen Isotherms", vol. LXXIII, Jan.–Mar. 1951, pp. 373–380.

(List continued on next page.)

Primary Examiner—Russell Adams
Assistant Examiner—Manish Shah
(74) Attorney, Agent, or Firm—Fitzpatrick, Cella, Harper & Scinto

(57) ABSTRACT

The present invention relates to a liquid composition for forming a colored portion on a recording medium together with an anionic or cationic water-based ink containing a coloring material. The liquid composition comprises a solvent, fine particles in a dispersion state, wherein the fine particles have a surface charge in a polarity opposite to the water-based ink and has ion whose polarity is opposite to that of the fine particles in an ionic equivalence of 0.1–40 meq/l.

37 Claims, 12 Drawing Sheets

FOREIGN PATENT DOCUMENTS

| | | |
|---|---|---|
| EP | 1 197 533 A1 | 4/2002 |
| JP | 55-65269 A | 5/1980 |
| JP | 55-66976 A | 5/1980 |
| JP | 55-150396 A | 11/1980 |
| JP | 56-120508 A | 9/1981 |
| JP | 61-59911 B2 | 12/1986 |
| JP | 61-59912 B2 | 12/1986 |
| JP | 61-59914 B2 | 12/1986 |
| JP | 63-22681 A | 1/1988 |
| JP | 63-60783 A | 3/1988 |
| JP | 63-299971 A | 12/1988 |
| JP | 64-9279 A | 1/1989 |
| JP | 64-63185 A | 3/1989 |
| JP | 4-259590 A | 9/1992 |
| JP | 5-16015 B2 | 3/1993 |
| JP | 6-92010 A | 4/1994 |
| JP | 8-72393 A | 3/1996 |
| JP | 8-224955 A | 9/1996 |
| JP | 10-146991 A | 6/1998 |
| JP | 2000-34432 A | 2/2002 |

OTHER PUBLICATIONS

Roček, et al., Institute of Chemical Process Fundamentals, Czechslovak Academy of Sciences, "Porous Structure of Aluminum Hydroxide and its Content of Psuedoboehmite", Applied Catalysis, 74, Elsevier Science Publishers B.V., (1991), pp. 29–36.

"Surface Science", Gakkai Shuppan Center (Japan Scientific Societies Press) pp 326–327, (Kenji Tamaru, ed.) (1985).

* cited by examiner

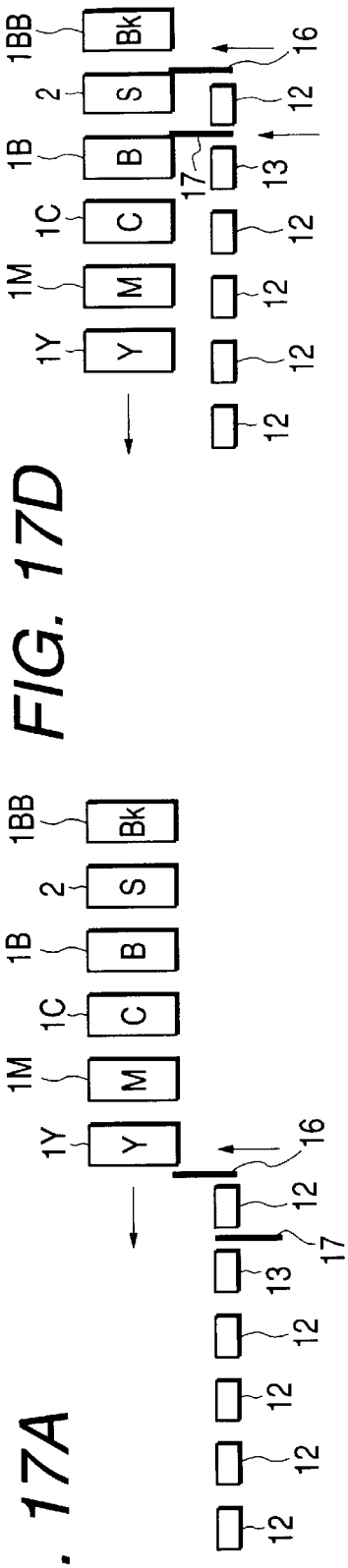
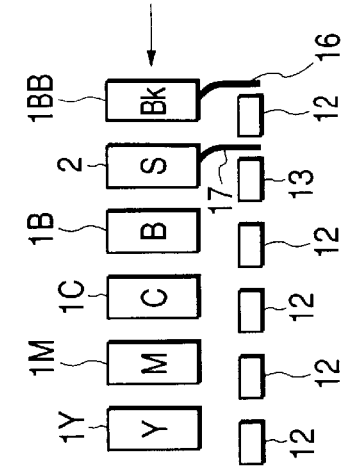
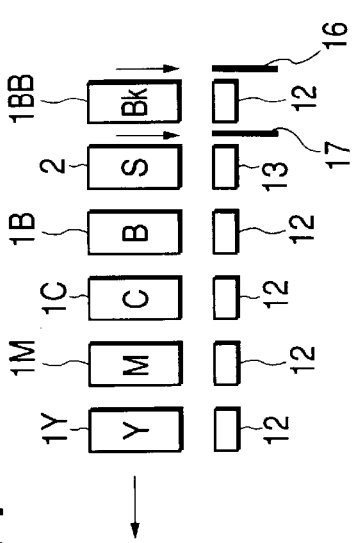
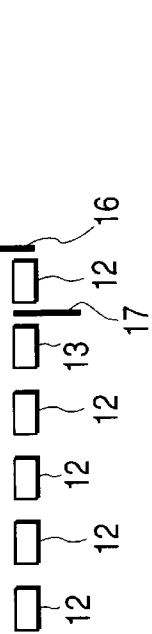
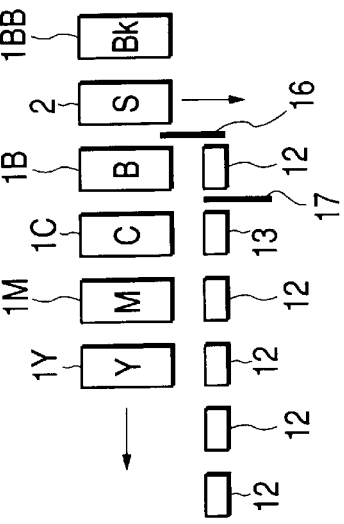
FIG. 17A  FIG. 17B  FIG. 17C
FIG. 17D  FIG. 17E  FIG. 17F

LIQUID COMPOSITION, INK SET, METHOD FOR FORMING COLORED PORTION ON RECORDING MEDIUM, AND INK-JET RECORDING APPARATUS

BACKGROUND OF THE INVENTION

1. Field of the Invention

The present invention relates to a technique to obtain a color image excellent in color and color evenness, more particularly to a liquid composition most suitable for ink-jet recording systems, and an ink set using such a liquid composition, a method and an ink-jet recording apparatus for forming a colored portion on a recording medium.

2. Related Background Art

The ink-jet recording method conducts recording by ejecting ink to apply the ink onto a recording medium such as paper. For example, Japanese Patent Publication Nos. 61-59911, 61-59912 and 61-59914 disclose an ink jet recording system where an ink droplet is ejected by the action of a bubble formed in the ink by applying thermal energy to the ink by using an electrothermal converter as an ejection-energy supply means. With this system, a head having high-density multi-orifice can be realized with ease, and images of high-resolution and high quality can be obtained at high speed.

In general, conventional inks for ink-jet recording contain water as a principal component, and in addition, a water-soluble solvent having a high boiling point such as glycol to prevent drying and clogging at orifices. When such an ink is used for recording on a recording medium, sometimes there arise problems such as insufficient fixation, and uneven image presumably due to the uneven distribution of a filler and/or a size on the surface of the recording medium such as paper.

Besides, image quality as high as the silver salt photographic image has recently become required for ink-jet recorded image, leading to intense technical demands for higher optical density, wider color reproduction range and more enhanced color evenness on ink-jet recorded image.

Under such circumstances, various proposals have heretofore been made to stabilize the ink-jet recording process and to enhance the quality of articles recorded by the ink-jet recording process. One of the proposals on the recording medium is to coat the surface of a base paper of the recording medium with a filler and/or a size. For example, there has been disclosed a technique to form an ink receiving layer on the base paper by applying porous fine particles that adsorb a coloring material on the base paper as a filler. Recording media produced by using these techniques are now on the market as the ink-jet coating paper etc.

The followings are some of the representative proposals on the ink-jet inks in the prior arts.

(1): Addition of a Volatile Solvent or a Penetrating Solvent to the Ink;

As means for quickening the fixing property of the ink onto a recording medium, Japanese Patent Application Laid-Open No. 55-65269 discloses addition of a compound such as a surfactant to increase the penetrability of the ink. Also, Japanese Patent Application Laid-Open No. 55-66976 disclosed the use of an ink containing mainly a volatile solvent.

(2): Mixing of an Ink and a Liquid Composition Reactive with the Ink on a Recording Medium;

In order to improve the image density, the water-fastness, and bleeding as well, there has been proposed a method where a liquid composition that can improve image quality is applied to a recording medium before or after the ink application to the recording medium for image formation. More specifically, Japanese Patent Application Laid-Open No. 63-60783 discloses a method in which a liquid composition containing a basic polymer is applied to a recording medium, and an ink containing an anionic dye is then applied thereto, thereby conducting recording. Japanese Patent Application Laid-Open No. 63-22681 discloses a recording method in which a first liquid composition containing a reactive chemical substance and a second liquid composition containing a compound reactive with the chemical substance are mixed on the recording medium. Further, Japanese Patent Application Laid-Open No. 63-299971 discloses a method in which a liquid composition containing an organic compound having two or more cationic groups per molecule is applied to the recording medium, and then recording is conducted with an ink containing an anionic dye. Japanese Patent Application Laid-Open No. 64-9279 discloses a method in which an acidic liquid composition containing succinic acid or the like is applied to a recording medium, and recording is then conducted with an ink containing an anionic dye.

Further, Japanese Patent Application Laid-Open No. 64-63185 discloses a method in which a liquid composition that can insolubilize dyestuff is applied to the recording medium prior to application of an ink. Further, Japanese Patent Application Laid-Open No. 8-224955 discloses a method in which a liquid composition containing two kinds of cationic substances having respective molecular weight distribution is used with an ink containing anionic compound. Japanese Patent Application Laid-Open No. 8-72393 discloses a method in which a liquid composition containing a cationic substance and finely ground cellulose is used together with an ink. In both publications, it is shown that the obtained image is excellent in image density, character quality, water fastness, color reproducibility and bleeding problem. Further, Japanese Patent Application Laid-Open No. 55-150396 discloses a method in which recording is conducted with a dye ink on a recording medium, and a water-fastness enhancing agent that forms a color lake with the dye is then applied to provide water-fastness to the recorded image.

(3): Mixing of an Ink and a Liquid Composition Containing Fine Particles on a Recording Medium;

Japanese Patent Application Laid-Open No. 4-259590 discloses a method where first a colorless liquid containing colorless fine inorganic particles is applied to a recording medium and then a non-aqueous recording liquid is applied. Japanese Patent Application Laid-Open No. 6-92010 discloses a method where first a solution containing fine particles or fine particles and a binder polymer is applied to a recording medium, and then applied is an ink containing a pigment, a water-soluble resin, a water-soluble solvent and water. Further, Japanese Patent Application Laid-Open No. 2000-34432 discloses a recording material comprised of an ink and a liquid composition comprised of water-insoluble fine particles, reciting that images with excellent printing quality and coloring properties are obtained regardless of the types of the paper sheets.

SUMMARY OF THE INVENTION

Inventors of the present invention have studied various ink-jet recording techniques as described above and found that these prior arts can solve respective technical problems effectively, but sometimes at the sacrifice of other ink-jet recording properties. For example, it is well known that the above-described recording medium obtained by coating the surface of the base paper of the recording medium with a filler and/or a size (hereinafter referred to as coated paper) allows formation of high-quality images.

In general, in order to obtain an image of high saturation, it is known that the coloring material should be maintained in a monomolecular film state without agglomeration on the surface of the recording medium. The porous fine particles on the coated paper have such function. However, in order to obtain images of both high density and high saturation with a given ink containing a coloring material, it is indispensable to form a thick ink-receiving layer so as to cover over the base paper using a large amount of the porous fine particles, which leads to the loss of the texture of the base paper. The present inventors considered that such a thick ink-receiving layer is required because the coloring matter is not effectively adsorbed on the porous fine particles.

Following explanation is made with a coated paper having one ink-receiving layer. FIG. 9 schematically illustrates a section of a coated paper in the vicinity of the surface thereof. In FIG. 9, reference numerals 901 and 903 indicate a base paper and an ink-receiving layer, respectively. The ink-receiving layer 903 comprises porous fine particles 905 and an adhesive (binder) 907 for immobilize particles. When an ink is applied to the ink-receiving layer 903, the ink penetrates into the voids between the porous fine particles 905 by capillarity to form ink-penetrated portions 909. As illustrated in FIG. 9, since the density of the porous fine particles in the ink-receiving layer varies locally, the mode of ink penetration by capillary phenomenon varies locally. Therefore, the coloring material cannot evenly contact with the surfaces of the porous fine particles in the course of ink penetration, so that the coloring material are not efficiently adsorbed by the porous fine particles.

Further, penetration of the ink is partially inhibited by the adhesive 907, and thus the ink-receiving layer 903 has portions into which the ink could not penetrate and which cannot contribute to coloring. For this reasons, the adsorption of coloring material in a monomolecular state by the fine particles is not efficient compared with the particle amount in the conventional coated paper. As a result, a great amount of the porous fine particles are required to provide a high-quality image, impairing the texture of the base paper.

Further, the inventors have found that although the above described technique (1) can improve the fixation properties of the ink onto a recording medium, but sometimes it may cause reduction of image density or reduction of color reproduction range which is an important factor in recording on plain paper and color image recording. Further, the inventors have found that the above described technique (2) can provide a recorded matter of a high image density as the coloring material in the ink is held on the surface of a recording medium, but sometimes sufficient color reproduction range and chroma cannot be obtained supposedly due to the agglomeration of the coloring material on the surface of the recording medium. Also, by means of the above described technique (3), the surface conditions of the recording medium is improved by applying a solution containing the fine particles, but images of the same preciseness and fine color as that formed on coated paper can not be obtained. Finally, especially regarding a non-aqueous recording ink, there are limitations on the selectivity of the coloring materials and on the methods for recording. Thus, it has a problem in degree of freedom for choice.

As mentioned above, every conventional method still has a certain problem to solve. Thus, the present inventors recognized the necessity of developing new ink-jet recording techniques in order to obtain an ink-jet recorded matter of a higher quality level than that demanded today. The present invention has been made on the basis of such recognition.

Accordingly, the present invention aims to provide a liquid composition to be employed for obtaining a high quality ink jet recorded matter having a wider color reproduction range, and color evenness, which liquid composition is excellent in long term storage stability under high or low temperature conditions, and excellent in ink-jet properties such as intermittent ejectability from the recording head and clogging resistance in the recording head.

Furthermore, this invention aims to provide a method for forming a colored portion on a recording medium, capable of forming even on a plain paper an excellent ink-jet recorded matter having wider color reproduction range, excellent color evenness, less banding in solid portion, which method is also excellent in ink-jet properties such as intermittent ejectability from the recording head and clogging resistance in the recording head.

Still further, this invention aims to provide a liquid composition that is capable of forming an excellent ink-jet recorded matter having a wider color reproduction range, excellent color evenness, well-suppressed banding in solid portion, and which liquid composition is excellent in long term storage stability under high or low temperature conditions, and excellent in ink-jet properties such as intermittent ejectability from the recording head and clogging resistance in the recording head, as well as an ink set combined with the liquid composition, and an ink-jet recording apparatus using the liquid composition.

According to one aspect of the present invention, there is provide a liquid composition for forming a colored portion on a recording medium together with an anionic or cationic water-based ink containing a coloring material, comprising a solvent, fine particles in a dispersion state, wherein the fine particles have a surface charge in a polarity opposite to the water-based ink, and the liquid composition further comprises ion whose polarity is opposite to that of the fine particles in an ionic equivalence of 0.1–40 meq/l. According to another aspect of the present invention, there is provided an ink set comprising an ink and a liquid composition respectively, the ink being an anionic or cationic water based ink, and the liquid composition comprising a solvent, fine particles in a dispersion state, wherein the fine particles have a surface charged in a polarity opposite to the water-based ink and wherein the liquid composition further comprises ion whose polarity is opposite to that of the fine particles in an ionic equivalence of 0.1–40 meq/l. According to further aspect of the present invention, there is provided a method for forming a colored portion on a recording medium, comprising the steps of:

(i) applying an ink containing a coloring material to a recording medium; and (ii) applying a liquid composition as described above.

According to still further aspect of the present invention, there is provided an ink-jet recording apparatus comprising an ink container containing an ink comprising a coloring material, and a liquid compositioncontainer containing the liquid composition as described above, and an ink-jet head for ejecting the ink and the liquid composition respectively.

After investigation to solve the above-mentioned technical problems of the prior arts, the present inventors found out that when a liquid dispersion of fine particles that can adsorb the coloring material are used with an ink, both in a liquid state, liquid—liquid reaction between the coloring material in the ink and the fine particles occurs to enhance both the density and color saturation of the resulting image with high reliability, and made the present invention.

In this specification, "reaction between the coloring material and the fine particles", means interactions between them including, covalent bonding, ionic bonding, physical and chemical adsorption, absorption, and adhesion. In this specification, "intermittent ejectability" means ejection stability of the first droplet ejected from the recording head after a pause of ink ejection. Thus, excellent intermittent ejectability allows longer ejection pause without impairing ejection stability, requiring less frequency of preliminary ejection or suction operation for recovery, thus contributing to throuput improvement of the recording apparatus or to reduction of running cost.

BRIEF DESCRIPTION OF THE DRAWINGS

FIG. 4A shows movement of the respective heads to the home position from the printing region and rising of the blade for ink;

FIG. 4B shows wiping of printing heads;

FIG. 4C shows wiping of liquid composition-ejection head; and

FIG. 4D shows lowering of the blades.

FIG. 5A shows rising of the respective blades;

FIG. 5B shows movement of the respective heads toward the printing region from the home position and wiping;

FIG. 5C shows lowering of the blade for the liquid composition and wiping of the printing heads; and FIG. 5D shows lowering of the blade for ink, respectively;

FIG. 6A shows rising of the blade for ink;

FIG. 6B shows movement of the respective heads to the printing region from the home position and wiping of printing heads;

FIG. 6C shows movement of the respective heads to the home position from the printing region, waiting of the blade for ink, and rising of the blade for the liquid composition; and FIG. 6D shows movement of the respective heads to the home position and wiping of the liquid composition-ejection head, respectively;

FIGS. 17A, 17B, 17C, 17D, 17E, and 17F schematically illustrate wiping operation of the ink-jet printing apparatus in FIG. 16:

FIG. 17A shows rising of the blade for an ink;

FIG. 17B shows wiping of printing heads;

FIG. 17C shows lowering of the blade for ink;

FIG. 17D shows rising of both blades after a liquid composition was applied to a proper position;

FIG. 17E shows wiping of the head for the liquid composition and the head for the second black ink; and FIG. 17F shows lowering of both blades.

DETAILED DESCRIPTION OF THE PREFERRED EMBODIMENTS

Figure 1:
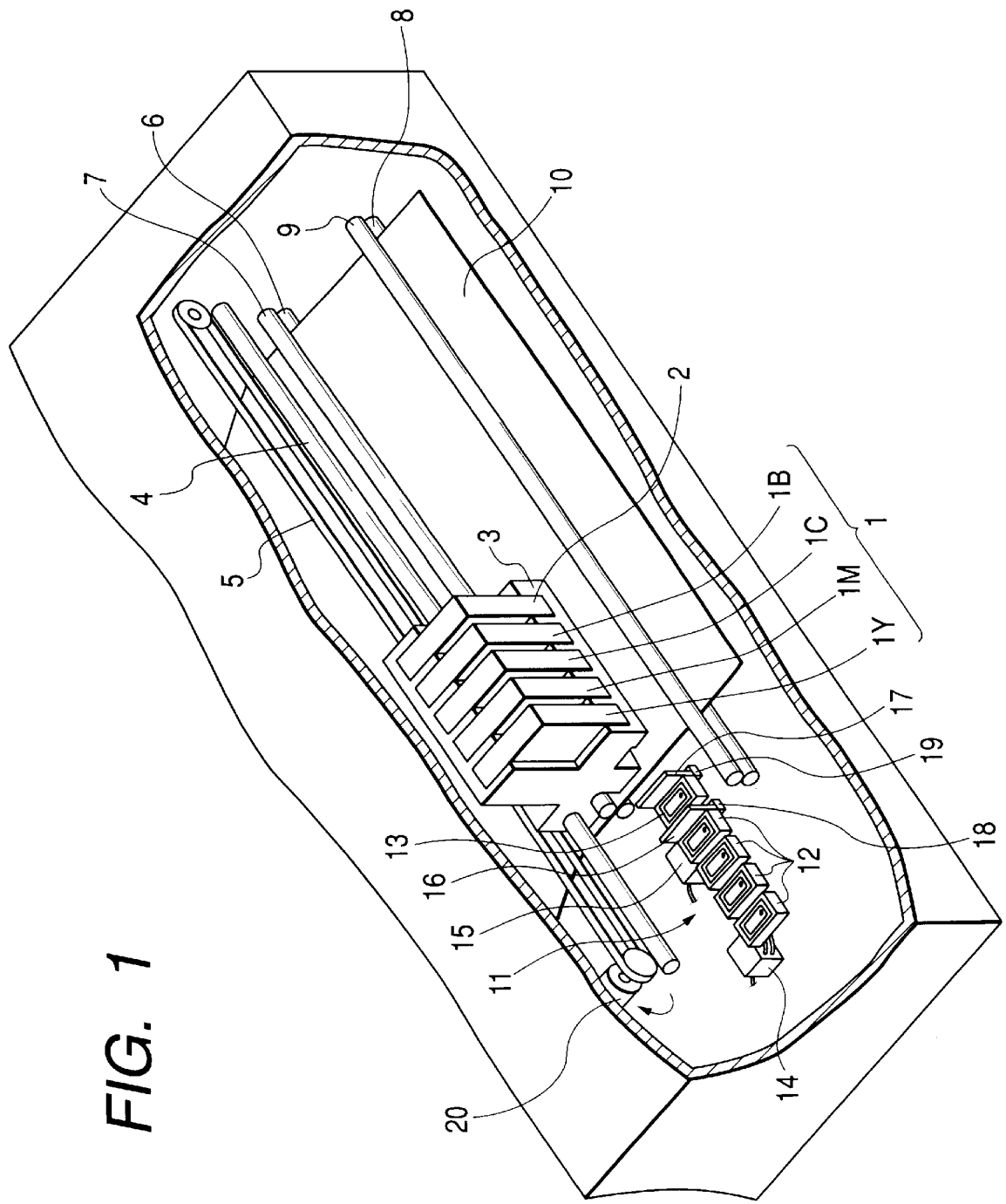
FIG. 1 is a partial opened perspective view schematically showing an ink-jet printing apparatus according to the invention.

The present invention will be described below with reference to preferable embodiments.

One embodiment of the present invention is an aqueous liquid composition to be applied onto the recording medium with an aqueous anionic or cationic ink containing a coloring matter to form a colored part on the recording medium. The liquid composition is characterized in that it contains fine particles having a surface charge of a polarity opposite to that of the aqueous ink, and has a ion(s) having a polarity opposite to that of the fine particles in an ionic equivalence range of 0.1 to 40 meq/l. The preferable embodiment of the method for forming a colored portion on the recording medium comprises the steps of (i) applying the ink containing the coloring material and (ii) applying the liquid composition of the present invention to the recording medium where the ink and the liquid composition come in contact each other in a liquid condition on the surface of the recording medium. By employing such embodiment, an ink jet-recorded product having a wider color-reproducible range, excellent color evenness, less banding in a solid partcan be obtained stably.

Another embodiment of the ink set according to the present invention that can achieve the above-described object is a combination of an ink containing a coloring material and the liquid composition. By using such an ink set, one can obtain stably an ink jet-recorded product having a wider color reproduction range, excellent color evenness, less banding in a solid part. In addition to the simple constitution of the ink and the liquid composition, simple adjustment of the ionic equivalence of the counter ion of the fine particles (hereinafter referred to as the counter ion equivalence) in the liquid composition to a certain range enables excellent intermittent ejectability and clogging resistance in the recording head as well as good storage stability. As a result, image formation can be stably carried out to give a high-quality ink jet-recorded product.

It is not clearly known why the present invention can achieve advantageous effects as described above. The inventors consider as follows. The inventors have been studying the mechanisms of agglomerate formation of fine particles at or near the surface of the recording medium when the ink and the liquid composition are mixed on the recording medium.

In order to explain the mechanism more specifically, the recording mechanism of the present invention is described with reference to FIG. 13 and FIGS. 14A to 14D. Here, description is made with an instance where used a water-based ink containing a water-soluble dye having an anionic group, i.e. anionic dye, and, in combination, a water-based liquid composition containing fine particles having cationically charged surface in a dispersion state.

First, a recorded image according to the present invention is described with reference to FIG. 13.

Before that, terms used in the specification are defined. The term "monomolecular state" as used herein means that a coloring material such as a dye or pigment is in a state being dissolved or dispersed in the ink as single molecules. If the coloring material slightly aggregates, the state is still called "monomolecular" so long as the saturation of the formed image is not lowered. Since to be monomolecular is desirable for dyes, such a state is called "monomolecular state" with other coloring materials for convenience.

Figure 13:
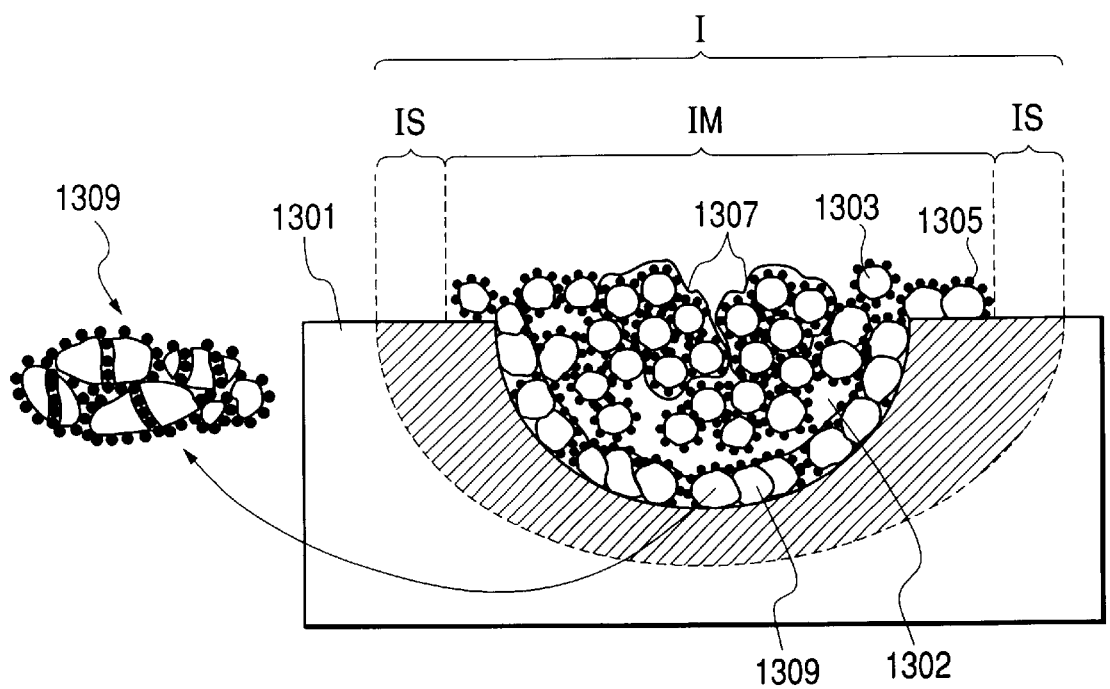
FIG. 13 is a schematic cross-sectional view illustrating the state of the colored portions of an ink-jet image according to invention.

FIG. 13 is a typical illustration of a colored portion I of a recorded image according to the present invention, which is comprised of a main image portion 1M and a peripheral portion IS thereof. In FIG. 13, reference numeral 1301 indicates a recording medium, and 1302 voids among fibers of the recording medium. Reference numeral 1303 designates fine particles typically illustrated, on which a coloring material 1305 is chemically adsorbed. The main image portion 1M is formed by the fine particles 1303 on the surfaces of which the coloring material 1305 has been uniformly adsorbed in a monomolecular state, and agglomerates 1307 of the fine particles, in which the monomolecular state of the coloring material is maintained. Reference numeral 1309 indicates agglomerates of the fine particles existing near the fibers of the recording medium within the main image portion IM. The main image portion IM is formed by the step of adsorption of the fine particles 1303 physically or chemically by the fibers of the recording medium, and the step of adsorption of the coloring material 1305 by the fine particles 1303 in a liquid—liquid state. Therefore, the coloring properties of the coloring material are scarcely impaired, and even on an easily penetrable recording medium such as plain paper, it can be formed images of high image density and saturation with a color reproduction range as wide as on coated paper.

On the other hand, the free coloring material 1305 not adsorbed to the surface of the fine particles 1303 penetrates into the recording medium 1301 in both transverse and longitudinal directions. Thus, delicate feathering of the ink is formed at the peripheral portion IS. As the coloring material remains in the vicinity of the surface of the recording medium 1301 and the delicate feathering of the ink occurs at the peripheral portion, it is possible to form of an image not having whitish haze and color irregularity and excellent in color evenness even in an image region such as solid portions or shadow portions where a large amount of the ink is applied. According to the present invention, when the recording medium 1301 has a permeability to the ink and liquid composition, the penetration of the ink or the liquid composition into the recording medium is not completely prevented but allowed to some extent, as shown in FIG. 13.

Further, with the liquid composition according to the present invention, when agglomeration 1309 of fine particles is formed in the surface region of the recording medium, pores of a certain size are formed in the agglomeration. When the free coloring material 1305 in the ink penetrates into the recording medium, it penetrates into the pores of the agglomeration 1309 of fine particles and attaches to around the opening and inside of the pores in an ideal monomolecular state, whereby more coloring material is held in the surface region of the recording medium, and a recorded matter of excellent color can be obtained. The present invention was made on this finding.

Figure 14A:
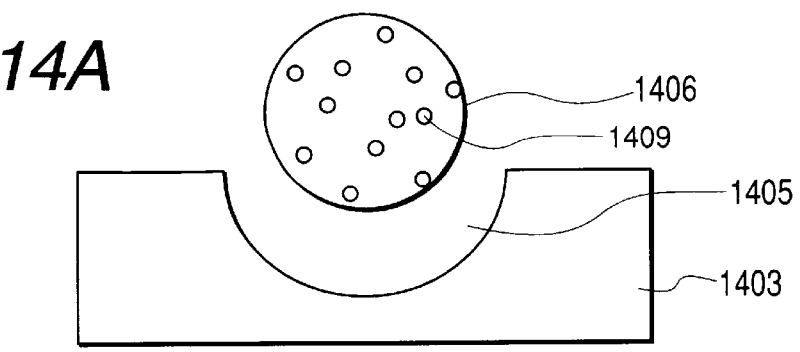
FIGS. 14A, 14B, 14C, and 14D are outlined process figures illustrating the process of forming the colored portions of an ink-jet image according to the invention.

FIGS. 14A to 14D illustrate a forming process of a colored portion on the recording medium according to one aspect of the present invention, showing a schematic cross-sectional view of a colored portion 1400. In FIGS. 14A to 14D, reference numeral 1401 indicates a portion mainly containing a reaction product of an ink and a liquid composition, for example, a reaction product between a coloring material and fine particles (hereinafter referred to as "reaction portion"), corresponding to the main image portion 1M in FIG. 13. Reference numeral 1402 designates a portion formed by an ink portion not reacted with the liquid composition and oozed in the periphery of the reaction portion 1401 (hereinafter referred to as "ink ooze portion"), and corresponding to the peripheral portion 1S in FIG. 11. Such a colored portion 1400 is formed, for example, in the following manner. In FIG. 14A, reference numeral 1405 denotes a typical void between fibers of a recording medium 1403. As described later, the method for making a colored part on a recording medium of the invention can provide a recorded matter having a very high image density and color saturation. Presumably, such advantages are derived from synthetic effects of the mechanisms described below.

Figure 14B:
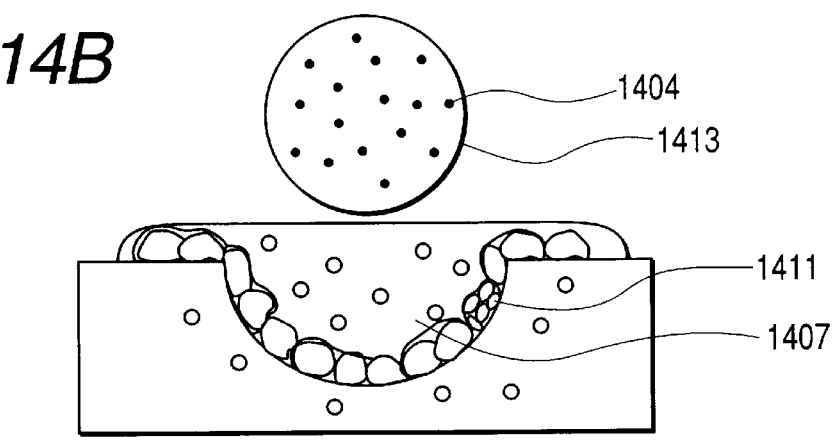

A liquid composition 1406 containing fine particles 1409 reactive with the coloring material 1404 is first applied as a droplet to the recording medium 1403. As a result, a pool 1407 of the liquid composition is formed (FIG. 14B). In the pool 1407, fine particles 1409 near the fiber surfaces of the recording medium are physically or chemically adsorbed onto the surfaces of the fibers of the recording medium, and the dispersed state of the fine particles becomes unstable to form agglomerates 1411 of the fine particles themselves, while the fine particles 1409 apart from the fibers in the pool 1407 are in the original dispersed state.

Figure 14C:
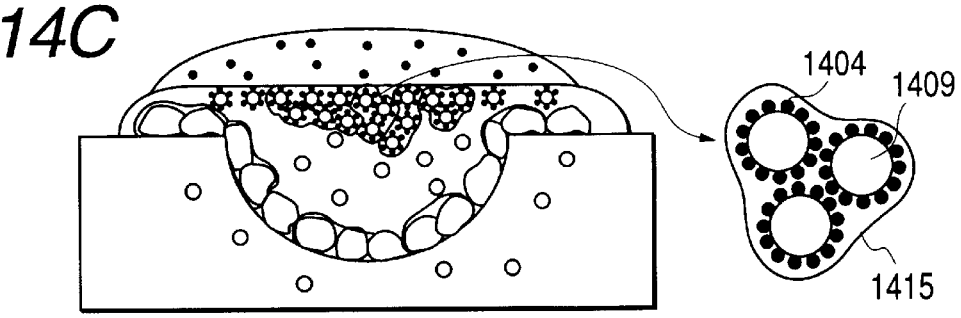

Then an ink 1413 containing a colorant 1404 is applied as a droplet to the recording medium 1403 as shown in FIG. 14B. As a result, the coloring material 1404 is chemically adsorbed by the fine particles 1409 at an interface between the ink 1413 and the pool 1407. Since this reaction is a reaction between liquids (liquid—liquid reaction), the coloring material 1404 is considered to be uniformly adsorbed in a monomolecular state on the surfaces of the fine particles 1409 (FIG. 14C). More specifically, it is considered that the coloring material would not agglomerate by itself at the vicinity of the surfaces of the fine particles, or agglomeration is very little, if any. As a result, a large number of fine particles adsorbing the coloring material 1404 in the monomolecular state are formed on the surface of the reaction portion 1401, and the coloring material remains in the monomolecular state on the surface area which affects the coloring most. Therefore, a recorded image high in image density and saturation can be formed.

Further, it is considered that the fine particles which adsorbed the coloring material then agglomerate by themselves as the dispersed state becomes unstable (FIG. 14C). As a result, the agglomerates 1415 formed are holding the coloring material in the monomolecular state inside thereof. Owing to the presence of such agglomerates 1415, the method of the invention enables formation of a recorded image of high image density and saturation.

Further, a part of unreacted coloring material 1404 diffuses in the pool 1407 to be adsorbed on the surfaces of unreacted fine particles 1409. As described above, the reaction further proceeds within the pool 1407, so that an image of still higher image density and saturation is formed. The agglomerates 1411 of the fine particles formed on the surfaces of fibers of the recording medium are considered to inhibit the penetration of the liquid phase in the pool 1407 into the recording medium. As a result, there are more of coloring material and fine particles in the pool 1407 to enhance the contact probability of the coloring material 1404 with the fine particles 1409, and the reaction proceeds uniformly and sufficiently to form an image of more uniformity with high image density and saturation.

When the liquid composition 1406 is applied to the recording medium 1403 (FIG. 14A), or the ink 1413 is applied to the pool 1407 (FIG. 14B), the dispersion medium is subject to changes rendering the dispersion state of the fine particles 1409 unstable so that some fine particles 1409 may agglomerate before the coloring material 1404 is adsorbed thereon. The term "changes" of the dispersion medium as used herein means changes in physical properties generally observed when a liquid is mixed with other liquids or substances, such as pH, solid concentration, solvent composition, and dissolved ion concentration in the liquid phase. It is considered that when the liquid composition contacts the recording medium or the ink, these changes take place rapidly and complexly to break the dispersion stability of the fine particles, and the agglomerates are formed. It is considered that these agglomerates 1415 serve to fill the voids of the fibers and to hold more fine particles 1409 having adsorbed the coloring material 1404 in the surface region of the recording medium 1403.

Among these agglomerates 1415 formed in the pool 1407, there are those adsorbed on the recording medium and those suspended in the liquid phase (having mobility). Those having mobility can adsorb the coloring material 1404 in a monomolecular state on the surfaces thereof in the same manner as with the fine particles as above described above, to form larger agglomerates which contribute to the enhancement of coloring. The agglomerates are considered to move together with the liquid phase upon the penetration of the liquid phase along the fibers so as to fill the voids to smooth the surface of the recording medium, thereby contributing to the formation of an image more uniform and high in image density.

The reason why high coloring of the image is obtained, as shown later, by the present invention is considered that the coloring material is adsorbed in a monomolecular state on the fine particles or on the agglomerates thereof to remain in the vicinity of the surface of the recording medium. Also fastness of the formed image such as water fastness and rub-off resistance, is enhanced since the fine particles adsorbed the coloring material in the monomolecular state remain fixed on the surface of the recording medium.

Incidentally, although in the above explanation the liquid composition and the ink are applied to the recording medium in this order, the application order of them to the recording medium is not limited thereto, so far as the liquid—liquid mixing of them occurs. Therefore, application may be in an order of the ink and then the liquid composition.

Figure 14D:
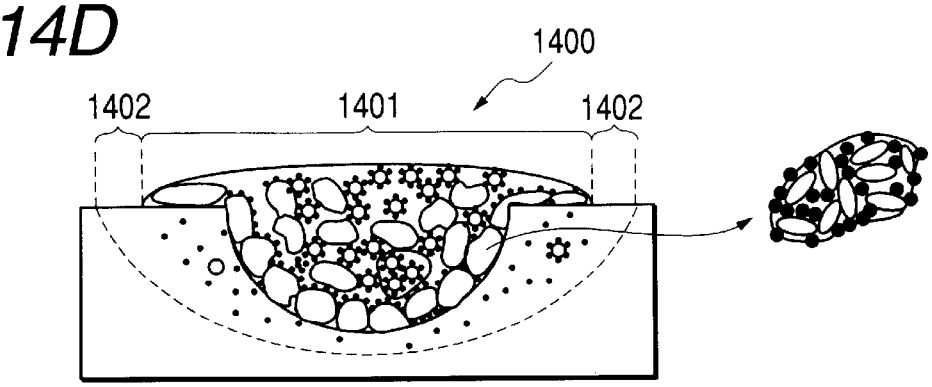

As illustrated in FIG. 14B, at least a part of the fine particles in the liquid composition applied to the recording medium are considered to penetrate into the interior of the recording medium as the liquid medium penetrates into the recording medium. Meanwhile, as illustrated in FIG. 14D, it is also presumable that, in this penetration process, the coloring material are adsorbed by the fine particles already penetrated in the recording medium. As described above, the fine particles, on which the coloring material has been adsorbed or bonded in a monomolecular state in the recording medium, are considered to contribute to the improvement of coloring ability. Further, it is considered that the fixing ability is also improved by such penetration of the liquid medium.

In addition, by using the liquid composition of the present invention, when the agglomerate 1411 of the fine particles are formed on or in the surface of the recording medium, pores of a certain size are formed inside the agglomerate. The coloring material 1404 not adsorbed to the fine particles 1409 in the pool 1407 penetrates into the recording medium, and some of 1404 passes through the pores together with the solvent component to penetrate into the inside of the agglomerate 1411. At this time, the coloring material 1404 adsorbs to the vicinity of the openings and to the inner walls of the pores in the agglomerate, and only the solvent penetrates into the inside of the recording medium. Thus, much more amount of coloring material can adsorb to the surface and the inside of the agglomerate 1411 of the fine particles to remain in the surface region of the recording medium. In addition, when the coloring material 1404 is a dye, the coloring material 1404 adsorbed to the inside of the pores hardly agglomerates and forms an ideal monomolecular state, since a diameter of the pores of the agglomerate 1411 is from one to several times as large as the molecular size of the coloring material 1404 in the ink. This contributes greatly to further improvement of coloration, and recorded products having a wider color reproduction range can be obtained.

[Ionic Equivalence of Counter Ions of Fine Particles]

The present invention is characterized by that the ionic equivalence of counter ions of the dispersed fine particles in the liquid composition (counter ion equivalence) is in the range of 0.1–40 meq/l. Here, the term "counter ion equivalence" corresponds to the sum of the molar concentration of each counter ion multiplied by the ionic valence thereof. For example, when the liquid composition contains monovalent counter ions and divalent counter ions as the counter ions at A mol/l and B mol/l respectively, the counter ion equivalence of the liquid composition is calculated as follows:

Counter ion equivalence (meq/l)=$A \times 1 + B \times 2$.

The ionic concentration of the liquid composition can be determined by ion chromatography. Specifically, after removing fine particles from the subject liquid composition by centrifugation or filtration, the liquid is subjected to ion chromatography using a column suitably selected for the subject ionicity, and the ionic concentration is determined from a calibration curve obtained with known samples.

In the liquid composition of the present invention, the counter ion equivalence is adjusted to be in the range of 0.1–40 meq/l. Thus, the dispersion stability of the liquid composition is improved, and, agglomeration and precipitation of the fine particles or thixotropy development will not occur easily, even when the liquid composition is stored for a long period of time under a hot or cold environment. This mechanism is considered that an electrical double layer is formed on the particle surface in a thickness sufficient to increase electrostatic repulsion between the particles when the ionic equivalence of the counter ions is in the range as defined above. At the same time, the liquid composition of the present invention is also excellent in intermittent ejectability and anti-clogging properties. The mechanism is not clarified yet but considered as follows.

When an ordinary liquid composition is ejected from a recording head, the solvent component of the composition such as water starts to evaporate at the meniscus in the nozzle orifice immediately after the ejection, resulting in concentration of the liquid composition in the nozzle. With the progress of concentration, the fine particles in the liquid composition come to close each other and form agglomerates near the orifice to confer viscosity to the liquid, which may result in decreased ejection stability or clogging of the nozzle. On the other hand, with the liquid composition of the present invention, the ion equivalence of ions having a polarity opposite to the polarity of the fine particle surface is controlled to generate high ionic repulsion between fine particles. Thus, particle agglomeration in the nozzle is repressed to maintain stable flowability of the liquid composition in any time, whereby can be achieved excellent intermittent ejection stability and prevention of nozzle clogging even after long-term storage.

In the present invention, more preferably, the counter ion equivalence is in the range of 1.0–30 meq/l. Specifically, if the counter ion equivalence is within this range, high dispersion stability is maintained even with fine particles of very small size that can form agglomerates having fine porous structure described later, or of non-spherical, highly anisotropic particles such as acicular or plate form. Thus, the above-described advantageous effects can be obtained.

Incidentally, the inventors have found that not only the fine particles in the liquid composition, but also the solvent composition affects the physical properties of the agglomerate 1411, and that the size of the pores in the agglomerate 1411 made with fine particles 1409 on the recording medium closely relates to further improvement of coloration of the ink. Thus, in one more preferable embodiment of this invention, the size and volume of the pores of the agglomerate of fine particles is set in a certain range by subjecting the liquid composition to a certain processing.

According to the study of the present inventors, when the counter ion equivalence of the liquid composition is adjusted to be in a specific range, the dispersion stability of the liquid composition is improved, and agglomeration and precipitation of the fine particles or thixotropy development will not occur easily, even when the liquid composition is stored for a long period of time under a hot or cold environment.

The inventors of the present invention have found that when the fine particles in the liquid composition and the coloring material in the ink are reacted on the recording medium, very good results can be obtained with a combination of an ink and a liquid composition where the ink is an anionic or cationic aqueous ink and the liquid composition contains fine particles having surface charge opposite to the ink. For example, when the coloring material of the ink is anionic, it adsorbs very efficiently to the surface of the cationic fine particles. In order to achieve the adsorption of the coloring material to the same extent as with the present invention by using a coated paper for ink jet recording, a large amount of the cationic porous fine particles is required, that is, a thick ink-receiving layer covering over the base paper is indispensable, which may spoil the texture of the base paper. On the other hand, in the present invention, the amount of the fine particles in the liquid composition applied to the recording medium is so small that the texture of the recording medium is not spoiled. As a result, it is possible to form an image where the texture of the printed part is congruous with that of the unprinted part.

Further, according to Prior art (1) described before, the amount of the coloring material remained on the surface of the recording medium may not be sufficient, and according to Prior art (2) described before, even if the amount of the coloring material remained on the surface of the recording medium is sufficient, the coloring material agglomerates on the surface of the recording medium. On the contrary, in the present invention, the coloring material adsorbed to the surface of the fine particles remains together with the fine particles on the surface of the recording medium maintaining the monomolecular state. Thus, an image of high coloration can be obtained.

The present invention seems to be similar to Prior art (3), in the point that the image is formed by applying an ink and a liquid composition containing fine particles to the surface of the recording medium. However, in the present invention, the liquid composition is positively reacted with the coloring material using the fine particles in the liquid composition as means for inhibiting agglutination of the coloring material (lake). On the other hand, in the Prior art (3), application of a solution containing fine particles aims to modify the surface condition of the recording medium and no concept is disclosed of chemical reaction between the fine particles and the coloring material in the ink, those having different polarities each other. And the difference of the image quality of the recorded products according to the present invention and the prior art is remarkable, presumably due to the difference of the mechanism, providing images excellent in density and saturation and good image formation properties such as fixability.

The method for measuring the liquid composition, characteristic to the present invention will be described below in detail, as well as the ink and liquid composition.

First, a cationic ink or anionic ink in the present specification is defined. When the ionic characteristics of an ink are mentioned, it is well known in the art that the ink itself is not charged, but neutral. The term "anionic ink" or "cationic ink" as used herein means that a component of the ink, for example, a coloring material, has an anionic or cationic group, or its surface has been treated with a compound having an anionic or cationic group, which groups are adjusted so as to behave as an anionic or cationic group in the ink. The same is said with the anionic or cationic liquid composition.

<Liquid Composition>

First described is the liquid composition of the present invention.

Fine Particle Agglomerate

As already described in the above recording mechanism, when used for image formation, the fine particles will agglomerate on the recording medium, and pores of a certain size will be formed in the agglomerate. The coloring material that is present in a free state in the ink also penetrates into the pores as the ink penetrates, and is adsorbed in an ideal monomolecular state to the vicinity of the pore openings and inner wall of the pores. Thus, more coloring material remains near the surface of the recording medium, whereby recorded matters having superior coloring can be obtained.

Therefore, it is preferable to design the liquid composition of the present invention in such a manner that pores are formed in the agglomerates of the fine particles to a certain extent at the time of image formation. Here, the pores of the agglomerate can be measured by the following method. By setting the pore volume of pores of which radius measured by such a method to be in a predetermined range, the above-described mechanism works to provide excellent image formation. First of all, in measuring physical properties of these pores, the liquid composition is pretreated in the following steps:

(1) the liquid composition as described above is dried in an atmospheric ambient at 120° C. for 10 hr to evaporate almost all solvent;
(2) then the temperature is raised from 120° C. to 700° C. for 1 hr and subsequently, and then to 700° C. for 3 hr for burning;
(3) then the temperature of the baked product as described above is lowered gradually to ordinary temperature, and the product is powdered.

This pretreatment is to form the agglomerate of fine particles from the liquid composition by drying, to completely remove the solvent by burning so as to empty the pores in the agglomerate as pore space. Incidentally, pulverization in step (3) is carried out to ease the measuring operations and does not affect the pore radius or pore volume substantially.

In the present invention, the pore radius and pore volume can be suitably measured by the nitrogen adsorption and desorption method. In the present invention, when the pore size characteristics of the agglomerate measured by such a method are such that the volume of pores having a radius ranging from 3 nm to 30 nm is in a certain range, excellent image formation is achieved. It is unclear why high correlation is observed between the volume of the pores in this range and the image quality, but presumably because with the pore radius in the above range would not reduce penetration of the coloring material and the solvent component into the agglomerate significantly, and light scattering due to the pores themselves would not occur, so that pores contribute to the coloration improvement very efficiently.

Consequently, measuring both the volume of the pores having a radius ranging from 3 nm to 30 nm, and the volume of pores having a radius larger than 30 nm is effective to determine the coloration ability in the image formation. As the method for measuring the physical properties of these pores in these ranges, the method employing the nitrogen adsorption and desorption method is most preferable. The radius of the pores and the volume of the pores can be known by the method of Barrett et al. (J. Am. Chem. Soc. Vol. 73, 373, 1951). The pretreated sample is degassed under vacuum at 120° C. for 8 hr, and then subjected to the determination by nitrogen adsorption and desorption method. More preferably, the volume of the pores having a radius ranging from 3 nm to 20 nm and the volume of those having a diameter larger than 20 nm are determined. These ranges is preferable when the coloring material is a dye, for seeking further improvement of coloration.

Radius and Volume of the Pores of the Agglomerate

As described above, preferably the radius of the pores of the agglomerate ranges from 3 nm to 30 nm in viewpoint of rapid penetration of and adsorption of the coloring material to around the opening and inner wall of the pores and of preventing agglomeration of the coloring material inside the pores. At the same time, in order to intake the coloring material in the agglomerate in an amount sufficient enough for improving coloration, a certain volume is required for the pores. As the increase of the volume of pores also means increase of the number of pores, not only the coloring material adsorbed to the inside of the pores, but also the coloring material adsorbed to around the opening of the pores will increase.

Thus, in these viewpoints, it is preferable that the volume of the pores having a radius ranging from 3 nm to 30 nm is 0.4 ml/g or more and the volume of the pores having a radius larger than 30 nm is 0.1 ml/g or less in the liquid composition preferably used for the present invention. By setting the pores to have a radius from 3–30 nm, the coloring material and the solvent component can penetrate into the agglomerate efficiently, so that pores contribute to the coloration improvement very efficiently. On the other hand, by setting the volume of the pores having a radius larger than 30 nm less than 0.1 ml/g, pores having large light scattering decrease, compensating the decreased improvement of coloration due to the decreased amount of the coloring material adsorbed to the vicinity of the pore openings. It is preferable that the volume of the pores having a radius ranging from 3 nm to 20 nm is 0.4 ml/g or larger and the volume of the pores having a radius larger than 20 nm is 0.1 ml/g or smaller. This means that there are a large number of pores having a radius ranging 3 nm to 20 nm, whereby coloration is further improved to enable formation of an image having a wider color reproduction range, particularly when a dye is used as the coloring material. The radius of the pores and the volume of the pores of the agglomerate are changed not only by the chemical species, shape, and size of the fine particles but also solvent species, other additives, their composition ratios, and the like. Thus, it is considered that controlling these conditions allows controlling the conditions of formation of the agglomerate of fine particles.

Action of Fine Particles

Actions expected to the fine particles in the liquid composition used in the present invention are, for example, 1) adsorption of a coloring material without impairing the inherent coloring ability of the coloring material on mixing; and 2) breakdown of the dispersion stability when they are mixed with an ink or applied to a recording medium, so as to remain on the surface of the recording medium. Fine particles showing such actions are preferably used. Incidentally, fine particles of one or more kinds may be used for such actions.

The preferable characteristics of the fine particles to satisfy the above action 1) includes an ionicity opposite to the coloring material used to adsorb the coloring material electrostatically. When the coloring material is anionic, cationic fine particles are used, while anionic fine particles are used when the coloring material is cationic. Besides the ionicity, adsorption of the coloring material is affected by the size and weight of the fine particles, and the surface profile thereof. For example, porous fine particles having many pores on the surface thereof exhibit specific adsorption characteristics and can adsorb the coloring material efficiently by virtue of a plurality of factors such as size and shape of the pores.

Action 2) is triggered by an interaction with an ink or a recording medium. Therefore, their respective constitutions may be designed for this. For example, the fine particles may exhibit an ionicity opposite to the components of the ink and the recording material. The dispersion stability is also affected by the presence of electrolytes in the ink or liquid composition. In the present invention, it is desirably designed that at least one of the actions 1) and 2) occurs instantly. It is further preferable that both actions 1) and 2) occur instantly. Liquid compositions containing the respective ionic fine particles will hereinafter be described specifically.

Next described are, a liquid composition containing cationic or anionic fine particles as a preferred embodiment of the liquid composition of the present invention.

<Cationic Liquid Composition>

Cationic liquid composition is, for example, exemplified by a liquid composition containing an acid and fine particles having a cationic group on the surface and being stably dispersed therein. In the present invention, as the cationic liquid composition, for example, those containing an acid and having a pH of 2 to 7, or those having a zeta potential ranging from +5 to +90 mV, can be preferably used.

pH and Zeta Potential

The zeta potential of a liquid composition is described. Basic principle of the zeta potential is as follows. As a rule, in a system where a solid matter is dispersed in a liquid, when a free electric charge is present on the surface of a solid phase, a layer of opposite charge appears in the liquid phase in the vicinity of the boundary of the solid phase to maintain electric neutrality. This is called electric double layer and the potential created by this electric double layer is called zeta potential. When the zeta potential is plus, the surface of the fine particles shows cationic property and when is minus, it shows anionic property. Generally, it is said that the higher the absolute value of the zeta potential is, the stronger the electrostatic repulsion working between the fine particles is, resulting in good dispersibility and also strong ionic property on the surface of the fine particles. In other words, with the cationic fine particles, the higher the zeta potential is, the stronger the cationic property and the force attracting anionic compound in the ink are.

As a result of intensive study of the inventors on the relationship between the zeta potential of the =liquid composition and the quality of the image formed with it, it was found that when a liquid composition of which zeta potential falls in the range from +5 to +90 mV, the colored portion formed on the recording medium shows particularly excellent coloring properties. The cause is unclear; probably, due to proper cationic properties of the fine particles, rapid cohesion of the anionic compound (anionic coloring material) will not occur and the anionic compound adsorbs thinly and evenly to the surface of the fine particles, not forming large lumps of lake. As a result, it is presumed that the inherent coloring characteristic of the coloring material is expressed in the better state. In addition, in the cationic liquid composition according to the present invention, even after the anionic compound adsorbed to the surface of the fine particles, the fine particles are weakly cationic, and the dispersion state becomes unstable. As a result, the fine particles agglomerate and adsorb easily to the surface of anionic cellulose fibers of the recording medium to remain in the surface region of the recording medium.

It is considered that this results in the following excellent advantageous effects, that is, excellent coloring properties comparable with the ink jet printing on coated paper can be obtained; excellent color evenness can be obtained because of less white haze and less color irregularity in an image area such as the shadow part and solid part where a large quantity of ink is applied; since the anionic compound adsorbs and develops color very efficiently to the surface of the fine particles in comparison with the coated paper, the application amount of the cationic fine particles can be reduced and thus, particularly with printing on plain paper, the texture of the paper is not lost. The more preferable zeta potential of the liquid composition ranges from +10 to +85 mV and in this range, boundaries between dots in solid printing become inconspicuous and a good image having less banding due to head scanning is obtained. Further, use of the liquid composition containing the cationic fine particles of which zeta potential falls in the range from +15 to +65 mV enables an image of very excellent coloration, regardless of the paper type.

It is preferable that pH of the cationic liquid composition according to the present invention, in viewpoint of storage stability and adsorption of the anionic compound, ranges from 2 to 7 at about 25° C. In this pH range, when the liquid composition is mixed with the anionic ink, stability of the anionic compound is not disturbed much and strong cohesion of the anionic compound does not occur, so that the reduction of color saturation or dull color of the recorded image can be prevented. Incidentally, in the range as described above, the dispersion state of the cationic fine particles is good and thus, storage stability of the liquid composition and ejection stability from a recording head can be maintained in a good condition. In addition, when the liquid composition of this pH is mixed with the ink, anionic material adsorbs sufficiently to the surface of the cationic fine particles and therefore, excessive penetration of the coloring material into the recording medium is suppressed to yield an ink jet-recorded product of excellent coloration. More preferably, the pH range is from 3 to 6. In this range, corrosion of the recording head due to long time storage can be very effectively prevented and also rub-off resistance of the printed part is further improved.

<Cationic Fine Particle>

Next, the component constituting the cationic liquid composition according to the present invention will be described. In order to achieve the function as described above, the cationic fine particles, the main component of the liquid composition, are required to have cationic properties on the surface of thereof when dispersed in the liquid composition. When the liquid composition and an ink are mixed, the cationic surface allows rapid adsorption of the anionic coloring material to the surface of the particles, thus suppressing excess penetration of the coloring material into the recording medium. As a result, the ink jet-recorded product of a sufficient optical density of image can be obtained. On the other hand, if the liquid composition contains the fine particles of which surface is not cationic and a water-soluble cationic compound, the coloring material coagulates mainly with the cationic compound, which deteriorates the coloring properties of the coloring material. As a result, coloration comparable with the ink-jet printing on the coated paper is difficult to obtain. Thus, the fine particles used for the liquid composition according to the present invention should have cationic surface. As the fine particles of the liquid composition of the invention, not only inherently cationic particles but also inherently statically anionic or neutral fine particles can be used so long as the surface thereof has been treated to be cationic.

The cationic fine particles preferable for the present invention are not specifically limited so long as they can form pores in the agglomerate when they agglomerate on the recording medium. For example, they are exemplified by cationized silica, alumina, hydrated alumina, titania, zirconia, boria, silica boria, ceria, magnesia, silica magnesia, calcium carbonate, magnesium carbonate, zinc oxide, hydrotalcite, etc., complex fine particles and organic fine particles thereof, and inorganic-organic complex fine particles. In the liquid composition according to the present invention, these fine particles can be used singly or in combination of two or more.

Among of these, fine particles of hydrated alumina are particularly preferable, because they have positively charged surface. In addition, hydrated alumina having a boehmite structure by X-ray diffraction is preferably used to obtain excellent coloration and color evenness, and storage stability. The hydrated alumina is expressed by the following formula:

$$Al_2O_{3-n}(OH)_{2n} \cdot mH_2O$$

wherein n represents one of integers 0 to 3, m has a value of 0 to 10 and preferably, 0 to 5, where $mH_2O$ represents dissociable water phase mostly not involved in the crystal lattice formation and thus, m can represent a value not an integer, and m and n are not 0 at the same time.

Generally, a crystal of hydrated alumina having a boehmite structure is a laminated compound of which face (020) forms a huge plane and shows a specific diffraction peak in the X-ray diffraction pattern. Other than a perfect boehmite, a pseudo boehmite structure, in which excess water is contained between laminae of the faces (020), can be possible. The X-ray diffraction pattern of the pseudo boehmite shows the diffraction peak broader than the perfect boehmite.

Boehmite and pseudo boehmite can not be clearly distinguished and hence, unless otherwise specified in the present invention, both are included in the hydrated alumina showing the boehmite structure (hereafter referred to as hydrated alumina). To determine the (020) face spacing and crystal thickness, the peak which appears at a diffraction angle 2θ of 14° to 15° is measured, and using the half width value B and the diffraction angle 2θ of the peak, the spacing is calculated by Bragg's formula and the crystal thickness is calculated by Scherrer's formula. The spacing of (020) can be used as an index of hydrophobicity and hydrophilicity of the hydrated alumina. The method for manufacturing hydrated alumina used in the present invention is not limited specifically. Hydrated alumina having a boehmite structure can be produced by the known methods such as hydrolysis of aluminum alkoxide, hydrolysis of sodium aluminate, and the like.

As disclosed in Japanese Patent Application Laid-Open No. 56-120508, hydrated alumina of boehmite structure can be produced from hydrated alumina being amorphous by X-ray diffraction by thermal treatment at the temperature of 50° C. or higher in the presence of water. A particularly preferable method is to yield hydrated alumina by hydrolysis and deflocculation of a long-chain aluminum alkoxide with an acid. The long-chain aluminum alkoxide is, for example, an alkoxide having 5 or more carbon numbers, and an alkoxide having carbon numbers of 12 to 22 is preferable because of easy removal of alcohol in a manufacturing step and easy control of the shape of aluminum alkoxide, as described later.

As the acid to be added to the long chain aluminum alkoxide, one or more of organic and inorganic acids can be used by choice. Nitric acid is most preferable in the point of reaction efficiency of hydrolysis and shape control and dispersibility of hydrated alumina yielded. It is possible to control the particle size by carrying out the hydrothermal synthesis after this. If hydrothermal synthesis is carried out by using a dispersion of hydrated alumina containing nitric acid, nitric acid is taken up by the surface of hydrated alumina as a nitrate radical group resulting in improvement of dispersibility of the hydrate in water.

Hydrated alumina preparation by hydrolysis of the above long chain aluminum alkoxide has an advantage that contamination of impurities such as various ions would not occur in comparison with the method for manufacturing alumina hydrogel and cationic alumina. In addition, the long-chain aluminum alkoxide has another advantage that alcohol can be completely removed from the hydrated alumina in comparison with a short-chain alkoxide such as aluminum isopropoxide. It is preferable that the pH of the solution at the start of hydrolysis is set lower than 6. pH of 8 or lower can effectively inhibit the final hydrated alumina from having crystalline properties. pH higher than 8 is not preferable since the final product of hydrated alumina becomes crystalline.

The hydrated alumina used for the present invention can be a hydrated alumina containing a metal oxide such as titanium dioxide so long as it has the boehmite structure by X-ray diffraction. Preferably, the metal dioxide such as titanium dioxide can be contained in hydrated alumina in the range from 0.01 to 1.00% by weight in view of high optical density, and more preferably 0.13 to 1.00% by weight for fast adsorption of the coloring material whereby occurrence of blotting or beading is inhibited. In addition, the titanium dioxide should have a titanium valence of +4. Content of titanium dioxide can be analyzed by the ICP method melting titanium oxide in boric acid. Distribution of titanium dioxide in hydrated alumina and the valence of titanium are analyzed by employing ESCA (Electron Spectroscopy for Chemical Analysis).

For example, etching of the surface of hydrated alumina with argon ion for 100 sec and 500 sec allows examination of the change of titanium content. When the valence of titanium becomes less than +4, titanium dioxide may act as a catalyst to cause deterioration of weather fastness of the printed matter and yellowing of the printed matter.

Titanium dioxide may be contained only in the surface region of hydrated alumina or may be contained in the internal part too. Otherwise, content may change from the surface to the internal part. It is more preferable that titanium dioxide is contained in only the close vicinity of the surface, because the electric characteristics of hydrated alumina is easily maintained.

To manufacturing hydrated alumina containing titanium dioxide, a method hydrolyzing a mixture solution of aluminum alkoxide and titanium alkoxide is preferable, as described by Tamaru (ed., 1985. Surface Science, p. 327. Published by Gakkai Shuppan Center), Alternatively, it can be manufactured by adding aluminum alkoxide as a nuclear for crystal growth to the mixture solution of aluminum alkoxide and titanium alkoxide when it is hydrolyzed.

In the place of titanium dioxide, oxides of silica, magnesium, calcium, strontium, barium, zinc, boron, germanium, tin, lead, zirconium, indium, phosphorus, vanadium, niobium, tantalum, chromium, molybdenum, tungsten, manganese, iron, cobalt, nickel, ruthenium, and the like can be contained for use. For example, hydrated alumina containing silica can improve rub-off resistance of the printed part.

The (020) face spacing of hydrated alumina used preferably for the present invention ranges from 0.614 nm to 0.626 nm. Within this range, the dispersibility of hydrated alumina particles in the liquid composition is excellent, and thus a liquid composition excellent in storage stability and ejection stability can be obtained. The reason of these advantages is not clear. However, it is considered that when the (020) face spacing falls in the above range, the ratio of hydrophobic and hydrophilic parts of hydrated alumina falls in a proper range. Thus, good ejection stability of the liquid composition can be obtained because of the proper dispersion stability by moderate repulsion of particles in the liquid composition and the proper balance of wettability at the inside of the ejection orifice.

Preferably, hydrated alumina used in the present invention has a crystal thickness of (020) face of hydrated alumina ranging from 4.0 to 10.0 nm. This range is preferable because of excellent clearness and adsorption of the coloring material. According to findings by the present inventors, the spacing and crystal thickness of the (020) face have a correlation and therefore, when the spacing of the (020) face falls in the above range, the crystal thickness of the (020) face can be adjusted to the range from 4.0 to 10.0 nm.

In addition, alumina (aluminum oxide) made by thermal treatment such as calcination of hydrated alumina described above, metal aluminum, aluminum salt, etc., is preferably used because it also has a positive charge. There are alumina having crystalline forms such as α type and γ type, and δ, χ, η, ρ, β types and any of them can be used so long as it has a surface kept cationically, and is dispersible stably in water. Among them, the γ type is preferably used, since it is active in the surface, high in an adsorbing ability of the coloring material, is readily formed into a stable dispersion of relatively finely particulated particles and hence, excellent in coloration, storage properties, ejection stability, and the like.

In view of coloring and uniform coloring abilities, storage stability, etc, the cationic fine particles preferably have an average particle diameter within a range of from 0.005 to 1 μm determined by the dynamic light scattering method. When the average particle diameter is not within this range, the fine particles may excessively penetrate into the recording medium to lower the coloring and uniform coloring abilities, or they may precipitate in the liquid composition to lower the storage stability of the liquid composition. The average particle diameter is more preferably within a range of from 0.01 to 0.8 μm. Use of such fine particles can make the rub-off resistance and texture of a printed image on a recording medium particularly preferable. Further preferable is that having average particle size which ranges from 0.03 to 0.3 μm. Such fine particles are preferable because the pores having a radius in an aimed range are effectively formed in the agglomerates of fine particles formed on the recording medium.

<Physical Properties and Shape of the Cationic Fine Particles>

In order to form pores efficiently in the agglomerates of the fine particles formed on the recording medium and to adsorb efficiently the coloring material on the surface of the fine particles, preferable cationic fine particles to be used in the present invention are those having pores of which maximum radius ranges from 2 nm to 12 nm and the total volume of which is 0.3 ml/g or larger as determined by the nitrogen adsorption and desorption method described above. More preferably, the maximum radius of the pores ranges from 3 nm to 10 nm and the total volume of the pores is 0.3 ml/g or larger, because the agglomerate made of fine particles formed on the recording medium can have pores having a radius in the aimed range effectively.

When the BET surface area of the fine particles falls in the range from 70 to 300 $m^2/g$, there are sufficient sites for adsorption of the coloring material on the surface of the fine particles, whereby the coloring material remains effectively on and/or in the surface of the recording medium in the monomolecular state to contribute to coloration improvement.

The shape of the fine particles used in the present invention can be observed by the transmission electron microscopy using a sample prepared by dropping the fine particles dispersed in ion exchange water on a collodion membrane. In the present invention, the pores are formed within the agglomerate when the fine particles agglomerate on the recording medium. Accordingly, fine particles preferably used are rod-like or necklace-like non-globular ones in which primary particles having acicular, plate or globular shape are bound in a specific orientation to form a secondary particle.

According to findings by the present inventors, the plate-like shape is better in dispersibility in water than that of acicular and hairy bundle (cilia-like) and is more preferable because when the agglomerate is formed from fine particles, the orientation of the fine particles becomes random resulting in increase in the volume of the pores. Where, hairy bundle means the state in which acicular fine particles agglomerate like a bundle of hairs contacting each side face. It has been publicly known that the false boehmite, one of the hydrated aluminas particularly preferably usable in the present invention, has cilia-like and other shapes (Rocek J. et al. Applied Catalysis vol. 74: p. 29 to 36. 1991).

An aspect ratio of the plate-like particles can be calculated by the method defined in Japanese Patent Publication No. 5-16015. The aspect ratio is expressed by a ratio of the diameter to the thickness of the particle. Where, the diameter is defined as that of a circle having the same area as a projected image of the particle observed by an optical microscope or the electron microscope. A longitudinal-transverse ratio is expressed by the ratio of the diameter showing the maximum value to the diameter showing the minimum value of a plane face by observation similar to that of the aspect ratio. In case of hairy bundle shape, the aspect ratio can be determined by assuming that individual acicular hydrated alumina particles forming the hairy bundle is a cylinder, and measuring diameters of a top and a bottom circles and the length respectively, and calculating the ratio. In the most preferable shape of hydrated alumina, an average aspect ratio ranges preferably from 3 to 10 in the plate-like shape and the average aspect ratio ranges preferably from 3 to 10 in the hairy bundle. If the average aspect ratio falls in the range described above, the agglomerate made of fine particles can easily have a porous structure, because space is easily created between particles.

The content of the cationic fine particles in the liquid composition used in the present invention may be suitably determined within an optimum range according to the kind of substance used. However, it is preferably within a range of from 0.1 to 40% by weight, more preferably from 1 to 30% by weight, most preferably from 3 to 15% by weight from the viewpoint of achieving the objects of the present invention. In such a range, an image excellent in coloring can be stably obtained irrespective of the kind of paper used. In addition, the storage stability and ejection stability of the liquid composition also become excellent.

<Acid>

As described above, the preferable liquid composition according to the present invention contains an acid and is adjusted to 2 to 7 in the pH. The acid as a second component plays a role of ionizing the surfaces of the cationic fine particles to enhance surface potential, thereby enhancing the dispersion stability of the fine particles in a liquid, and moreover enhancing the adsorbing ability of an anionic compound in an ink and adjusting the viscosity of the liquid composition. No particular limitation is imposed on the acid suitably used in the present invention so far as it brings about the desired pH, zeta potential, and physical properties such as dispersibility of the fine particles. It may be freely selected for use from following inorganic acids and organic acids, for example.

Specific examples of the inorganic acids include hydrochloric acid, sulfuric acid, sulfurous acid, nitric acid, nitrous acid, phosphoric acid, boric acid and carbonic acid. The organic acids may be carboxylic acids, sulfonic acids and amino acids as mentioned below.

Examples of the carboxylic acids include formic acid, acetic acid, chloroacetic acid, dichloroacetic acid, trichloroacetic acid, fluoroacetic acid, trimethylacetic acid, methoxyacetic acid, mercaptoacetic acid, glycolic acid, propionic acid, butyric acid, valeric acid, caproic acid, caprylic acid, capric acid, lauric acid, myristic acid, palmitic acid, stearic acid, oleic acid, linoleic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, o-aminobenzoic acid, m-aminobenzoic acid and p-amino-benzoic acid.

Examples of the sulfonic acids include benzenesulfonic acid, methylbenzenesulfonic acid, ethylbenzenesulfonic acid, dodecylbenzenesulfonic acid, 2,4,6-trimethylbenzenesulfonic acid, 2,4-dimethylbenzenesulfonic acid, 5-sulfosalicylic acid, 1-sulfonaphthalene, 2-sulfonaphthalene, hexanesulfonic acid, octanesulfonic acid and dodecanesulfonic acid.

Examples of the amino acids include glycine, alanine, valine, α-aminobutyric acid, γ-aminobutyric acid, β-alanine, taurine, serine, ε-amino-n-caproic acid, leucine, norleucine and phenylalanine.

These may be used either singly or in any combination thereof in the liquid composition used in the present invention. Among these, in particular, acids having a primary dissociation constant pKa in water of 5 or less may be preferably used to enhance the dispersion stability of cationic fine particles and the ability to adsorb anionic compounds. Specific examples thereof are hydrochloric acid, nitric acid, sulfuric acid, phosphoric acid, acetic acid, formic acid, oxalic acid, lactic acid, maleic acid and malonic acid.

In the liquid composition according to the present invention, the mixing ratio of the cationic fine particles (A) and the acid (B) is preferably in the range from A:B=200:1 to 5:1 and more preferably, from 150:1 to 8:1 by weight to realize excellent dispersion stability of the cationic fine particles and adsorbability of the anionic compound to the surface of the fine particles.

<Other Constitutional Components>

Other components constituting the cationic liquid composition is specifically described below. The cationic liquid composition according to the present invention contains cationic fine particles as the essential component, preferably an acid as described above, and additionally, and usually water as a liquid medium. However, in addition, it may contain a water-soluble organic solvent and other additives such as wetting agents and so on.

Examples of the water-soluble organic solvent used herein include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, 1,2,6-hexanetriol, glycerol, N-methyl-2-pyrrolidone, 1,3-dimethylimidazolidinone, triethanolamine, sulfolane and dimethyl sulfoxide. Examples for the wetting agent include, for example, a nitrogen-containing compound such as urea, thio urea, ethylene urea, alkyl urea, alkylthio urea, dialkyl urea, and dialkylthio urea etc., and a saccharide such as glucitol, mannnitol, and inositol etc. Although no particular limitation is imposed on the content of the water-soluble organic solvent and the wetting agent, it may preferably be within a range of from 5 to 60% by weight, more preferably from 5 to 40% by weight based on the total weight of the liquid composition.

Besides the above components, additives such as viscosity modifiers, pH adjustors, antiseptics, various surfactants, antioxidants, evaporation accelerators, water-soluble cationic compounds and binder resins may be suitably incorporated as needed. The selection of the surfactants is particularly important from the viewpoint of controlling the penetrability of the liquid composition into a recording medium. The surfactant is exemplified by cationic surfactants such as compounds of primary, secondary, tertiary amine salt types, specifically, hydrochlorides, acetates, and the like of lauryl amine, palm amine, stearyl amine, rosin amine, and the like; compounds of quarternary ammonium salt type, specifically lauryl trimethyl ammonium chloride, cetyl trimethyl ammonium chloride, lauryl dimethylbenzyl ammonium chloride, benzyl tributyl ammonium chloride, benzalkonium chloride, and the like; pyridinium salt type compounds, specifically, cetyl pyridinium chloride, cetyl pyridinium bromide, and the like; imidazolin type cationic compounds, specifically, 2-heptadecenyl-hydroxyethylimidazolin, and the like; and ethylene oxide-added higher alkylamines, specifically, dihydroxyethyl stearylamine, and the like and an amphoteric surfactants showing cationic properties in a specific pH range can be used. Specifically, for example, amino acid type amphoteric surfactants; compounds of R—NH—CH$_2$—COOH type; compounds of betaine type, specifically, carboxylic acid salt type amphoteric surfactants such as stearyl dimethyl betaine, lauryl dihydroxyethyl betaine, and the like; and in addition, amphoteric surfactants such as sulfate ester type, sulfonate ester type, phosphate ester type, and the like are exemplified. In addition, as nonionic surfactants, the following nonionic surfactants are, for example, exemplified: polyoxyethylene alkylethers, polyoxyethylene alkylesters, polyoxyethylene sorbitan alkylesters, acetylene alcohols, acetylene glycols, and the like. In the present invention, 1 species or 2 or more species of these compounds can be properly selected for use. Among them, particularly, acetylene alcohols and acetylene glycols can be preferably used because of excellent penetrability into the plain paper and defoaming ability. The amount changes according to the surfactant used and 0.05 to 5% by weight to the total weight of the liquid composition is preferable to realize enough penetrability.

The water-soluble cationic compounds may be freely selected so far as the action and effect of the present invention is not impeded, for example, in order to impart additional cationic nature to the liquid composition.

The binder resins may be used in combination within a limit not impeding the texture of the recording medium used and the storage stability and ejection stability of the liquid composition, for example, to further improve the rub-off resistance of the printed image, and may be freely selected from water-soluble polymers such as polyvinyl alcohol, gelatin, polyvinylpyrrolidone, polyethylene oxide, casein, starch, carboxymethyl cellulose, emulsions such as polyacrylic acid, polyurethane, polyvinyl acetate and copolymers thereof, latexes such as SBR and NBR.

Surface Tension of the Liquid Composition

The liquid composition used in the present invention is preferably colorless or white, but may be toned according to the color of the recording medium used. Preferable physical properties of the liquid composition as described above are, the surface tension in a range of from 10 to 60 mN/m (dyne/cm), preferably 10 to 40 mN/m (dyne/cm), and the viscosity in a range of from 1 to 30 mPa·s (cP)

[Anionic Liquid Composition]

The anionic liquid composition according to the present invention is characterized in that the fine particles having the anionic group on the surface thereof is the essential constitutional component and the fine particles are dispersed stably. Further, it preferably contains a base, and the pH is adjusted to 7 to 12, and the zeta potential ranges −5 to −90 mV.

pH and Zeta Potential

As a result of intensive study of the inventors, it was found that when a liquid composition of which zeta potential falls in the range from −5 to −90 mV, the cationic compound (cationic coloring material) in the ink adsorbs to the surface of anionic fine particles effectively, and the colored portion formed on the recording medium shows particularly excellent coloring properties. The cause is unclear; probably, due to proper anionic properties of the fine particles, rapid cohesion of the cationic compound will not occur and the cationic compound adsorbs thinly and evenly to the surface of the fine particles, not forming large lumps of lake. As a result, it is presumed that the inherent coloring characteristic of the coloring material is expressed in the better state. In addition, in the anionic liquid composition according to the present invention, even after the cationic compound adsorbed to the surface of the fine particles, the fine particles are weakly anionic, and the dispersion state becomes unstable. As a result, due to the concentration change as the solvent penetrates into the recording medium, the fine particles agglomerate and remain in the surface region of the recording medium.

It is considered that this results in the following excellent advantageous effects, that is, excellent coloring properties comparable with the ink jet printing on coated paper can be obtained; excellent color evenness can be obtained because of less white haze and less irregular coloration in an image area such as the shadow part and solid part where a large quantity of ink is applied; since the cationic compound adsorbs and develops color very efficiently to the surface of the fine particles in comparison with the coated paper, the application amount of the anionic fine particles can be reduced and thus, particularly with printing on plain paper, the texture of the paper is not spoiled and rub-off resistance is excellent in the printed part. The more preferable zeta potential of the liquid composition ranges from −10 to −85 mV and in this range, boundaries between dots in solid printing become inconspicuous and a good image having less banding due to head scanning is obtained. Further, use of the liquid composition containing the cationic fine particles of which zeta potential falls in the range from −15 to −65 mV enables an image of very excellent coloration, regardless of the paper type.

It is preferable that pH of the anionic liquid composition according to the present invention, in viewpoint of storage stability and adsorption of the cationic compound, ranges from 7 to 12 at about 25° C. In this pH range, when the liquid composition is mixed with the cationic ink, stability of the cationic compound is not much lowered and strong cohesion of the cationic compound does not occur, so that the reduction of color saturation or dull color of the recorded image can be prevented. Incidentally, in the range as described above, the dispersion state of the anionic fine particles is good and thus, storage stability of the liquid composition and ejection stability from a recording head can be maintained in a good condition. In addition, when the liquid composition of this pH is mixed with the ink, cationic material adsorbs sufficiently to the surface of the anionic fine particles and therefore, excessive penetration of the coloring material into the recording medium is suppressed to yield an ink jet-recorded product of excellent coloration. More preferably, the pH range is from 8 to 11. In this range, corrosion of the recording head due to long time keeping can be very effectively prevented and also rub-off resistance of the printed part is further improved.

<Anionic Fine Particles>

Next, the component constituting the anionic liquid composition according to the present invention will be described. In order to achieve the function as described above, the anionic fine particles, the main component of the liquid composition, are required to have anionic properties on the surface of thereof when dispersed in the liquid composition. When the liquid composition and an ink are mixed, the anionic surface allows rapid adsorption of the cationic coloring material to the surface of the particles, thus suppressing excess penetration of the coloring material into the recording medium. As a result, the ink jet-recorded product of a sufficient optical density of image can be obtained. On the other hand, if the liquid composition contains the fine particles of which surface is not anionic and a water-soluble anionic compound, the coloring material coagulates mainly with the anionic compound, which deteriorates the coloring properties of the coloring material. As a result, coloration comparable with the ink-jet printing on the coated paper is difficult to obtain. Thus, the fine particles used for the liquid composition according to the present invention should have anionic surface. As the fine particles of the liquid composition of the invention, not only inherently anionic particles but also inherently statically cationic or neutral fine particles can be used so long as the surface thereof has been treated to be anionic.

The anionic fine particles preferable for the present invention are not specifically limited so long as they can form pores in the agglomerate when they agglomerate on the recording medium. For example, they are exemplified by anionized silica, alumina, hydrated alumina, titania, zirconia, boria, silica boria, ceria, magnesia, silica magnesia, calcium carbonate, magnesium carbonate, zinc oxide, hydrotalcite, etc., complex fine particles and organic fine particles thereof, and inorganic-organic complex fine particles. In the liquid composition according to the present invention, these fine particles can be used singly or in combination of two or more.

As described with the cationic fine particles, in view of coloring and uniform coloring abilities, storage stability, etc, the anionic fine particles preferably have an average particle diameter within a range of from 0.005 to 1 $\mu$m determined by the dynamic light scattering method. The average particle diameter is more preferably within a range of from 0.01 to 0.8 $\mu$m. Use of such fine particles can make the rub-off resistance and texture of a printed image on a recording medium particularly preferable. Further preferable is that having average particle size which ranges from 0.03 to 0.3 $\mu$m. Such fine particles are preferable because the pores having a radius in an aimed range are effectively formed in the agglomerates of fine particles formed on the recording medium.

<Physical Properties and Shape of the Anionic Fine Particles>

In order to form efficiently pores in the agglomerates of the fine particles formed on the recording medium and to adsorb efficiently the coloring material on the surface of the fine particles, preferable anionic fine particles to be used in the present invention are those having pores of which maximum radius ranges from 2 nm to 12 nm and the total volume of which is 0.3 ml/g or larger as determined by the nitrogen adsorption and desorption method described above. More preferably, the maximum radius of the pores ranges from 3 nm to 10 nm and the total volume of the pores is 0.3 ml/g or larger, because the agglomerate made of fine particles formed on the recording medium can have pores having a radius in the aimed range effectively.

When the BET surface area of the fine particles falls in the range from 70 to 300 $m^2/g$, there are sufficient sites for adsorption of the coloring material on the surface of the fine particles, whereby the coloring material remains effectively on and/or in the surface of the recording medium in the monomolecular state to contribute to coloration improvement.

The shape of the fine particles used in the present invention can be observed by the transmission electron microscopy using a sample prepared by dropping the fine particles dispersed in ion exchange water on a collodion membrane. In the present invention, the pores are formed within the agglomerate when the fine particles agglomerate on the recording medium. Accordingly, fine particles preferably used are rod-like or necklace-like non-globular ones in which primary particles having acicular, plate or globular shape are bound in a specific orientation to form a secondary particle.

The content of the anionic fine particles in the liquid composition used in the present invention may be suitably determined within an optimum range according to the kind of substance used. However, it is preferably within a range of from 0.1 to 40% by weight, more preferably from 1 to 30% by weight, most preferably from 3 to 15% by weight from the viewpoint of achieving the objects of the present invention. In such a range, an image excellent in coloring can be stably obtained irrespective of the kind of paper used. In addition, the storage stability and ejection stability of the liquid composition also become excellent.

<Base>

As described above, the preferable anionic liquid composition according to the present invention contains the base and is adjusted to pH 7 to 12. The base as the second component plays a role of ionizing the surfaces of the anionic fine particles to enhance surface potential, thereby enhancing the dispersion stability of the fine particles in a liquid, and moreover enhancing the adsorbing ability of a cationic compound, ex. cationic dye etc., in an ink and adjusting the viscosity of the liquid composition. No particular limitation is imposed on the base suitably used in the present invention so far as it brings about the desired pH, zeta potential, and physical properties such as dispersibility of the fine particles. It may be freely selected from following inorganic compounds and organic compounds.

Specifically, there may be used, for example, sodium hydroxide, lithium hydroxide, sodium carbonate, ammonium carbonate, ammonia, sodium acetate, ammonium acetate, morpholine, and alkanolamines such as monoethanolamine, diethanolamine, triethanolamine, ethylmonoethanolamine, n-butylmonoethanolamine, dimethylethanolamine, diethylethanolamine, ethyldiethanolamine, n-butyldiethanolamine, di-n-butylethanolamine, monoisopropanolamine, diisopropanolamine and triisopropanolamine. Among them, bases having a primary dissociation constant pKb in water of 5 or less may be particularly preferable for use because the dispersion stability of anionic fine particles and the ability to adsorb cationic compounds become excellent.

In the liquid composition according to the present invention, the mixing ratio of the anionic fine particles (A) and the base (B) is preferably in the range from A:B=200:1 to 5:1 and more preferably, from 150:1 to 8:1 by weight to realize excellent dispersion stability of the anionic fine particles and adsorbability of the cationic compound to the surface of the fine particles.

<Other Components>

Other components constituting the anionic liquid composition will now be described specifically. The anionic liquid composition used in the present invention comprises the anionic fine particles as an essential component and preferably contains such a base as described above, and besides generally includes water as a liquid medium. However, the liquid composition may further contain a water-soluble organic solvent and other additives, for example, viscosity modifiers, pH adjustors, antiseptics, various surfactants, antioxidants, evaporation accelerators, water-soluble anionic compounds and binder resins, may be suitably incorporated.

The surfactant is exemplified by anionic surfactants such as aliphatic acid salts, sulfate ester salts of higher alcohols, sulfate ester salts of liquid fatty oils, alkylaryl sulfonate salts, and the like and non ionic surfactants such as polyoxyethylene alkylethers, polyoxyethylene alkylesters, polyoxyethylene sorbitan alkylesters, acetylene alcohols, acetylene glycols, and the like. In the present invention, one or more species of these compounds can be properly selected for use. Among those as described above, particularly, acetylene alcohols and acetylene glycols can be preferably used because of excellent penetrability thereof into the plain paper and defoaming ability. The optimum amount for use changes according to the surfactant, but within the range of 0.05 to 5% by weight to the total weight of the liquid composition, the surfactant can confer enough penetrability to the liquid composition, so the amount is preferably adjusted in this range.

<Surface Tension of the Liquid Composition>

The liquid composition used in the present invention is preferable colorless or white, but may be toned according to the color of the recording medium used. Preferable physical properties of the liquid composition as described above are: surface tension in the range of from 10 to 60 mN/m (dyne/cm), preferably 10 to 40 mN/m (dyne/cm), and viscosity in the range of from 1 to 30 mPa·s(cP).

Method for Liquid Composition Preparation

The liquid composition according to the present invention, containing the fine particles as described above, can be prepared by a conventional method generally employed for dispersion. Specifically, a suitable method to adjust the average particle size or granularity distribution of the fine particles in the liquid composition in the above-described range includes dispersion treatment by using a disperser such as roll mill, sand mill, homogenizer, ultrasonic homogenizer, and hyper pressure emulsifier (e.g., Nanomizer (trade name)), and classification treatment such as centrifugation and ultrafiltration. By using such means, the particle size can be made uniform.

<Water-Based Ink>

Anionic Ink

An aqueous anionic ink constituting an ink set of the present invention in combination with a cationic liquid composition described above will now be described. The anionic ink used in the present invention contains a water-soluble dye having an anionic group as a coloring material. When a water-insoluble dye or a pigment is used as a coloring material, an anionic compound is preferably used in combination with the coloring material. In addition to the coloring material, the anionic ink in the present invention further contains water, a water-soluble organic solvent and other components, for example, a viscosity modifier, a pH adjustor, an antiseptic, a surfactant, an antioxidant, rust preventives, antimold agents, evaporation accelerators, chelating agents and water-soluble polymers in addition to the above-described components, etc., as needed. These individual components for the ink will hereinafter be described.

Water-Soluble Dye

No particular limitation is imposed on the water-soluble dyes having an anionic group used in the present invention so far as they are listed in the Color Index, for example, water-soluble acid dyes, direct dyes or reactive dyes. Dyes not listed in the Color Index may also be used without any particular limitation so far as they have an anionic group, for example, a sulfonic group or a carboxylic group. The water-soluble dyes used herein include those having pH dependent solubility.

Pigment

Another aspect of the aqueous anionic ink is an ink containing a pigment and an anionic compound in place of a water-soluble dye having an anionic group as described. It further contains water, a water-soluble organic solvent and other optional components such as a viscosity modifier, a pH adjustor, an antiseptic, a surfactant, and an antioxidant. In such an ink, the anionic compound may be contained as a dispersing agent for the pigment. The dispersing agent for the pigment may not be anionic, so long as the ink contains an anionic compound. Of course, when the dispersing agent is anionic, another anionic compound may be added.

No particular limitation is imposed on pigments usable in the present invention. However, for example, pigments described below may be preferably used. As carbon black used in black pigment inks, is preferably those produced by the furnace process or channel process having the primary particle diameter of from 15 to 40 mp, the surface area of from 50 to 300 m²/g as measured by the BET method, the oil absorption of from 40 to 150 ml/100 g as determined by using DBP, the volatile matter of from 0.5 to 10% and pH of from 2 to 9.

Examples of commercially-available carbon black having such properties include No. 2300, No. 900, MCF88, No. 40, No. 52, MA7, MA8 and No. 2200B (all, products of Mitsubishi Chemical Corp.), RAVEN 1255 (product of Columbian Carbon Japan Limited), REGAL 400R, REGAL 660R and MOGUL L (all, products of CABOT CO.), and Color Black FW1, Color Black FW18, Color Black S170, Color Black S150, Printex 35 and Printex U (all, products of Degussa AG). It may be newly prepared for the present invention.

Examples of pigments used in yellow inks include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83, C.I. Pigment Yellow 74, C.I. Pigment yellow 128, C.I. Pigment Yellow 134, and C.I. Pigment Yellow 93, C.I. Pigment Yellow 144.

Examples of pigments used in magenta inks include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112 and C.I. Pigment Red 122.

Examples of pigments used in cyan inks include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6 and C.I. Pigment Violet 19. Also, they may be those newly prepared for the present invention.

Dispersing Agent for Pigment

As a dispersing agent for pigment in the present invention, any water soluble resin may be used so far as it can disperse a pigment stably in water or an aqueous medium by the action of an anionic group. However, those having a weight average molecular weight ranging from 1,000 to 30,000, more preferably from 3,000 to 15,000 are particularly preferred. Specific examples of such water-soluble resins include block copolymers, graft copolymers and random copolymers composed of at least two monomers selected from hydrophobic monomers such as styrene, styrene derivatives, vinylnaphthalene, vinylnaphthalene derivatives and aliphatic alcohol esters of $\alpha,\beta$-ethylenically unsaturated carboxylic acids, and hydrophilic monomers such as acrylic acid and derivatives thereof, maleic acid and derivatives thereof, itaconic acid and derivatives thereof, and fumaric acid and derivatives thereof, and salts of these copolymers. These resins are alkali-soluble resins which dissolve in an aqueous solution of a base.

Besides, homopolymers composed of a hydrophilic monomer, or salts thereof may also be used. Further, water-soluble resins such as polyvinyl alcohol, carboxymethyl cellulose and condensates of naphthalenesulfonic acid and formaldehyde may also be used. However, use of an alkali-soluble resin has a merit that the viscosity of the resulting dispersion becomes lower, and dispersing operation easier. These water-soluble resins are preferably used within a range of from 0.1 to 5% by weight based on the total weight of the ink.

The pigment inks used in the present invention are prepared by dispersing or dissolving such pigment and water-soluble resin as described above in an aqueous medium. The aqueous medium preferably used in the pigment inks is a mixed solvent of water and a water-soluble organic solvent. As the water, it is preferable to use ion-exchanged water (deionized water) instead of tap water containing various ions.

When the dispersing agent is not an anionic polymer, it is preferable to further add an anionic compound to the above-described pigment-containing inks. Examples of such anionic compounds include low-molecular anionic surfactants as well as the high-molecular substances such as the alkali-soluble resins as described above.

Specific examples of the low-molecular anionic surfactants include disodium lauryl sulfosuccinate, disodium polyoxyethylene lauroylethanolamide sulfosuccinate, disodium polyoxyethylene alkyl-sulfosuccinates, carboxylated polyoxyethylene lauryl ether sodium salt, carboxylated polyoxyethylene tridecyl ether sodium salt, sodium polyoxyethylene lauryl ether sulfate, triethanolamine polyoxyethylene lauryl ether sulfate, sodium polyoxyethylene alkyl ether sulfates, sodium alkylsulfates and triethanolamine alkylsulfates. However, the low-molecular anionic surfactants are not limited to these compounds. The used amount of such an anionic substance as described above is preferably within a range of from 0.05 to 10% by weight, more preferably from 0.05 to 5% by weight based on the total weight of the ink.

Self-Dispersing Pigment

As a pigment usable in the anionic inks, it may be used a self-dispersing pigment which can be dispersed in water or an aqueous medium without using any dispersing agent. The self-dispersing pigment is a pigment having at least one kind of anionic hydrophilic group bonded directly or through another atomic group to the surface. The anionic hydrophilic group may be at least one selected from, for example, the following hydrophilic groups, —COOM, —SO$_3$M, —SO$_2$NH$_2$, —PO$_3$HM and —PO$_3$M$_2$ wherein M is hydrogen, alkali metal, ammonium or organic ammonium. The bridging atomic group may be an alkylene group having 1 to 12 carbon atoms, a phenylene group which may be substituted, or a naphthylene group which may be substituted.

Since the above-described pigment anionically charged by introducing the hydrophilic group onto the pigment surface exhibits excellent dispersibility in water by virtue of repulsion of the ion thereof, it retains a stably dispersed state without adding any dispersing agent or the like even when it is contained in an aqueous ink. Carbon black is especially preferable as the pigment.

Additive Components in Ink

Besides the above components, a surfactant, an antifoaming agent, an antiseptic and the like may be added to the pigment inks, as needed, to provide them as inks having desired physical properties.

Examples of the surfactant include anionic surfactants such as fatty acid salts, salts of higher alcohol sulfuric esters, salts of liquid fatty oil sulfuric esters and alkylarylsulfonic acid salts; and nonionic surfactants such as polyoxyethylene alkyl ethers, polyoxyethylene alkyl esters, polyoxyethylene sorbitan alkyl esters, acetylene alcohol and acetylene glycol. One or more of these surfactants may be suitable chosen for use. Among these surfactants, acetylene alcohols and acetylene glycols are suitably used because they have excellent penetrability into plain paper and defoaming ability. The amount of the surfactant used varies according to the kind of the dispersing agent used, but is desirably within a range of from 0.01 to 5% by weight based on the total weight of the ink. Preferably, the amount of the surfactant to be added is determined to render the surface tension of the resulting ink at 20° C is 10 mN/m (dyne/cm) or more, preferably 20 mN/m (dyne/cm) or more, further 30 mN/m (dyne/cm) but not higher than 70 mN/m (dyne/cm), because the occurrence of deformed printing (inaccurate ink landing) due to wetting of an orifice can be effectively prevented in an ink-jet recording system used in the present invention.

Pigment inks as described above are prepared as follows. First, a pigment is added to an aqueous solution containing at least water and a resin as a dispersing agent. The mixture is stirred and then subjected to a dispersion treatment by dispersing means described later, and if necessary, to a centrifugal treatment to obtain a desired dispersion. Other components as mentioned above are then added to the dispersion and stirred to prepare an ink.

When an alkali-soluble resin is used, a base or amine is preferably added to dissolve the resin in the dispersion. In this case, the amine or base is preferably added at least in an amount calculated from the acid value of the resin according to the following equation.

Amount (g) of amine or base={(acid value of the resin)×(molecular weight of the amine or base)×(amount of the resin)(g)}/5600.

It is effective to conduct premixing of a pigment suspension for at least 30 minutes before the dispersion treatment. This premixing serves to improve the wettability of the surface of the pigment and facilitate adsorption of the dispersing agent on the pigment surface.

Preferable examples of the base to be added to the dispersion containing the alkali-soluble resin as a dispersant include organic bases such as monoethanolamine, diethanolamine, triethanolamine, aminomethylpropanol and ammonia, and inorganic bases such as potassium hydroxide and sodium hydroxide.

Any ordinary dispersing machine may be employed as a dispersing machine to prepare the pigment ink. Examples thereof include ball mills, sand mills, etc. Of these mills, a high-speed sand mill may preferably be used, such as Super Mill, Sand Grinder, Beads Mill, Agitator Mill, Grain Mill, Dyno Mill, Pearl Mill and Coball Mill (all are trade names).

The ink used in the present invention may further contain a water-soluble organic solvent, surfactant, pH adjustor, antirusting agent, antioxidant, evaporation accelerating agent, chelating agent, and water soluble polymer etc., as needed.

The liquid medium used in the present invention to dissolve or disperse the coloring material is preferably a mixture of water and water-soluble organic solvent. Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones such as acetone; ethers such as tetrahydrofuran and dioxane; polyalkylene glycols such as polyethylene glycol and polypropylene glycol; alkylene glycols of which alkylene moiety has 2 to 6 carbon atoms such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether and diethylene glycol monomethyl (or monoethyl) ether; N-methyl-2-pyrrolidone; 1,3-dimethyl-2-imidazolidinone; sulfolane; dimethyl sulfoxide; cyclic amide compounds such as 2-pyrrolidone and ε-caprolactam; and imide compounds such as succinimide.

The content of the water-soluble organic solvent in each ink is generally within a range of from 1 to 40% by weight, preferably from 3 to 30% by weight based on the total weight of the ink, while the content of water in the ink is within a range of from 30 to 95% by weight. If the amount of water is less than 30% by weight, the solubility of the coloring material is deteriorated, and the viscosity of the resulting ink is increased. It is hence not preferable to use water in such a small amount. On the other hand, if the amount of water is greater than 95% by weight, the vaporizing component is too great to sufficiently satisfy the fixation properties.

The anionic inks used in the present invention may also be used for general water-soluble writing utensils, but are particularly suitable for use in an ink-jet recording system of a type that an ink is ejected by the bubbling phenomenon of the ink caused by thermal energy. This recording system has a feature that the ejection of the ink becomes extremely stable, and no satellite dots generate. In this case, the thermal properties (for example, the specific heat, the coefficient of thermal expansion, the heat conductivity, etc.) of the inks may however be controlled in some cases.

Cationic Ink

An aqueous cationic ink constituting an ink set of the present invention in combination with an anionic liquid composition described above will now be described. The cationic ink used in the present invention contains a water-soluble dye having a cationic group as a coloring material. When a water-insoluble dye or a pigment is used as a coloring material, an cationic compound is preferably used in combination with the coloring material. In addition to the coloring material, the cationic ink in the present invention further contains water, a water-soluble organic solvent and other components, for example, a viscosity modifier, a pH adjustor, an antiseptic, a surfactant, an antioxidant, rust preventives, antimold agents, evaporation accelerators, chelating agents and water-soluble polymers in addition to the above-described components, etc., as needed. These individual components for the ink will hereinafter be described.

Water-Soluble Dye

No particular limitation is imposed on the water-soluble dyes having a cationic group used in the present invention so far as they are listed in the Color Index. Dyes not listed in the Color Index may also be used without any particular limitation so far as they have an cationic group. The water-soluble dyes used herein include those having pH dependent solubility.

Pigment

Another aspect of the aqueous anionic ink is an ink containing a pigment and a cationic compound in place of a water-soluble dye having a cationic group as described. It further contains water, a water-soluble organic solvent and other optional components such as a viscosity modifier, a pH adjustor, an antiseptic, a surfactant, and an antioxidant. In such an ink, the cationic compound may be contained as a dispersing agent for the pigment. The dispersing agent for the pigment may not be cationic, so long as the ink contains a cationic compound. Of course, when the dispersing agent is cationic, another cationic compound may be added. No particular limitation is imposed on pigments usable in the present invention. Pigments described in the item of Anionic ink may be suitably used.

Dispersing Agent for Pigment

As a dispersing agent for pigment in the present invention, any water soluble resin may be used so far as it can disperse a pigment stably in water or an aqueous medium by the action of a cationic group. Specific examples thereof may include those obtained by polymerization of a vinyl monomer and having a cationic nature in at least a part of the resulting polymer. Examples of a cationic monomer for forming the cationic moiety include salts of such tertiary amine monomers as described below, and quaternized product thereof.

Namely, there are mentioned N,N-dimethylaminoethyl methacrylate $[CH_2=C(CH_3)-COO-C_2H_4N(CH_3)_2]$, N,N-dimethyl-aminoethyl acrylate $[CH_2=CH-COO-C_2H_4N(CH_3)_2]$, N,N-dimethylaminopropyl methacrylate $[CH_2=C(CH_3)-COO-C_3H_6N(CH_3)_2]$, N,N-dimethyl-aminopropyl acrylate $[CH_2=CH-COO-C_3H_6N(CH_3)_2]$, N,N-dimethylacrylamide $[CH_2=CH-CON(CH_3)_2]$, N,N-dimethylmethacrylamide $[CH_2=C(CH_3)-CON(CH_3)_2]$, N,N-dimethylaminoethylacrylamide $[CH_2=CH-CONHC_2H_4N(CH_3)_2]$, N,N-dimethylaminoethylmethacrylamide $[CH_2=C(CH_3)-CONHC_2H_4N(CH_3)_2]$, N,N-dimethylaminopropylacrylamide $[CH_2=CH-CONH-C_3H_6N(CH_3)_2]$ and N,N-dimethylaminopropyl-methacrylamide $[CH_2=C(CH_3)-CONH-C_3H_6N(CH_3)_2]$.

In the case of a tertiary amine, examples of a compound for forming a salt include hydrochloric acid, sulfuric acid and acetic acid. Examples of a compound used in quaternization include methyl chloride, dimethylsulfuric acid, benzyl chloride and epichlorohydrin. Among these, methyl chloride and dimethylsulfuric acid are preferred for preparing a dispersing agent used in the present invention. Such tertiary amine salts or quaternary ammonium compounds as described above behave as a cation in water, and under neutralized conditions, they are stably soluble in an acidic region. The content of these monomers in the copolymer is preferably within a range of from 20 to 60% by weight.

Examples of other monomers used in the formation of the above-described high-molecular dispersing agent include hydrophobic monomers, for example, acrylic esters having a hydroxyl group, such as 2-hydroxyethyl methacrylate; and acrylic esters having a side chain of long ethylene oxide chain; and styrene monomers, and water-soluble monomers soluble in water at a pH of about 7, such as acrylamides, vinyl ethers, vinylpyrrolidones, vinylpyridines and vinyloxazolidines. As the hydrophobic monomers, styrene, styrene derivatives, vinylnaphthalene, vinylnaphthalene derivatives, (meth)acrylic acid alkyl esters and acrylonitrile can be used. In the high-molecular dispersing agent obtained by the copolymerization, the water-soluble monomer be used in the range of from 15 to 35% by weight for the stability of the copolymer in an aqueous solution, and the hydrophobic monomer be used in the range of from 20 to 40% by weight for enhancing the dispersing effect of the copolymer to the pigment.

Self-Dispersing Pigment

As a cationically charged carbon black, those having at least one hydrophilic group selected from following quaternary ammonium groups bonded directly or through another atomic group to the surface thereof can be used. However, in the present invention, the hydrophilic groups are not limited thereto.

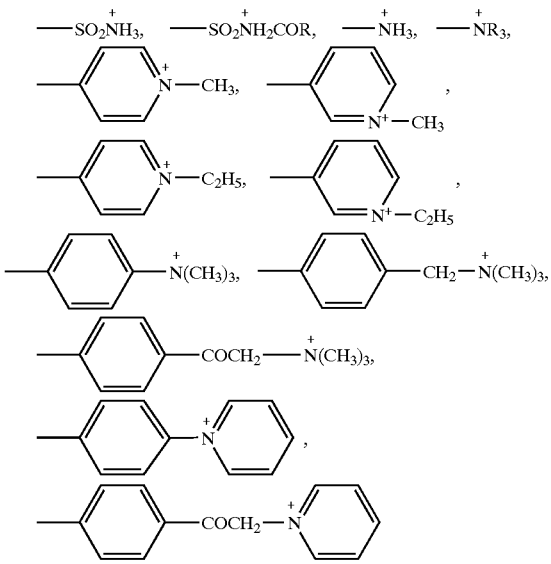

wherein R is a linear or branched alkyl group having 1 to 12 carbon atoms, a substituted or unsubstituted phenyl group, or a substituted or unsubstituted naphthyl group. Incidentally, the above-mentioned cationic groups may have, for example, $NO_3-$ or $CH_3COO-$ as a counter ion.

A preparation method of a cationically charged self-dispersing carbon black due to its hydrophilic group is explained with a method to introduce to a pigment an N-ethylpyridyl group:

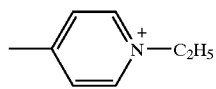

by treating carbon black with 3-amino-N-ethyl pyridinium bromide.

Since the pigment cationically charged by introducing the hydrophilic group into the pigment surface in the above-described manner exhibits excellent dispersibility in water by virtue of repulsion of the ion thereof, it retains a stably dispersed state without adding any dispersing agent or the like even when it is contained in an aqueous ink. Carbon black is especially preferable as the pigment.

<Additives in the Ink>

In addition to the components described above, in order to obtain an ink having desired physical properties, a surfactant, antifoaming agent or antiseptic can be added to the ink. The ink may contain a commercial water-soluble dye.

The surfactant is exemplified by cationic surfactants such as compounds of the primary, the secondary, and the tertiary amine salt types, specifically, hydrochlorides, acetates, and the like of lauryl amine, palm amine, stearyl amine, rosin amine, and the like; compounds of quarternary ammonium salt type, specifically lauryl trimethyl ammonium chloride, cetyl trimethyl ammonium chloride, lauryl dimethylbenzyl ammonium chloride, benzyl tributyl ammonium chloride, benzalkonium chloride, and the like; pyridinium salt type compounds, specifically, cetyl pyridinium chloride, cetyl pyridinium bromide, and the like; imidazolin type cationic compounds, specifically, 2-heptadecenyl-hydroxyethylimidazolin, and the like; and ethylene oxide-added higher alkylamines, specifically, dihydroxyethyl stearylamine, and the like and an amphoteric surfactants showing cationic properties in the specific pH range can be used. Specifically, for example, amino acid type amphoteric surfactants; compounds of R—NH—CH$_2$—CH$_2$—COOH type; compounds of betaine type, specifically, carboxylic acid salt type amphoteric surfactants such as stearyl dimethyl betaine, lauryl dihydroxyethyl betaine, and the like; and in addition, amphoteric surfactants such as sulfate ester type, sulfonate ester type, phosphate ester type, and the like are exemplified. In addition, as nonionic surfactants, the nonionic surfactants are, for example, exemplified by polyoxyethylene alkyl ethers, polyoxyethylene alkyl esters, polyoxyethylene sorbitan alkyl esters, acetylene alcohols, acetylene glycols, and the like. In the present invention, one or more species of these compounds can be properly selected for use. Among those as described above, particularly, acetylene alcohols and acetylene glycols can be preferably used, because they have excellent penetrability into the plain paper and defoaming ability. The use amount thereof changes according to the surfactant used and 0.05 to 5% by weight to the total weight of the liquid composition is preferable to realize enough penetrability.

Surface Tension of the Ink

The cationic inks used in the present invention may desirably be controlled so as to have, as their own physical properties at 25° C., a surface tension of 30 to 68 mN/m (dyn/cm) and a viscosity of 15 mPa·s (cP) or lower, preferably 10 mPa·s (cP) or lower, more preferably 5 mPa·s (cP) or lower from the viewpoints of improving the penetrability of the inks in printed images when printed on plain paper or the like, and of obtaining good compatibility of the inks with an ink-jet head.

<Concentration of Coloring Material in Water-Based Ink>

The concentration (by weight) of the coloring material in the anionic or cationic ink is suitably chosen according to the type of the coloring material (water-based dye, pigment of self-dispersing pigment). Usually, it is in the range of 0.1–20% by weight based on the weight of the ink, preferably, 0.1–12% by weight. When the concentration of the coloring material is in the range of 0.3–7% by weight, by controlling the relationship between the fine particle concentration in the liquid composition and the coloring material in the ink to a weight ratio of 1:1.2 or less, especially, 1:1.0 or less, images of especially excellent coloring properties can be obtained under ordinary two liquid recording system.

<Method for Forming the Colored Portion on the Recording Medium>

The method for forming the colored portion on the recording medium according to the present invention will be described below. The method for forming the colored portion on the recording medium according to the present invention has a step (i) to apply an anionic or cationic water-based ink containing the coloring material to the recording medium and the step (ii) to apply to the recording medium a liquid composition containing fine particles of which surface is charged to have the opposite polarity to the ink in a dispersed state, wherein on the surface of the recording medium, the water-based ink and the liquid composition contact each other in the liquid state. The method for applying the water-based ink and the liquid composition constituted as described above to the recording medium will be described below.

The method for forming the colored portion on the comprise a step (i) of applying such a liquid composition as described above to a recording medium and a step (ii) of applying the anionic or cationic aqueous ink containing a coloring material to the recording medium, wherein the liquid composition is applied to an image forming region or an image forming region and the vicinity thereof to bring about mutual contact between the ink and the liquid composition in a liquid state. Herein, the term "image-forming region" means a region where the ink dots are applied, and the term "the vicinity of the image-forming region" means an outside region about 1 to 5 dots away from the image-forming region.

In the method of forming a colored portion on the recording medium according to the present invention, the liquid composition and the ink may be applied by any method so far as they come into contact with each other in a liquid—liquid state. No problem arises if either of the liquid composition and the ink is first applied to the recording medium. For example, the step (ii) may be conducted after the step (i), or the step (i) may be conducted after the step (ii). It is also preferred that the step (i) be conducted after the step (ii), and then the step (ii) be repeated again. When the liquid composition is first applied to the recording medium, no particular limitation is imposed on the time interval between the composition application and the ink application. However, it is preferable to apply the ink to the recording medium at substantially the same time or within several seconds for the purpose of bringing them into contact with each other in a liquid state.

Recording Medium

No particular limitation is imposed on the recording medium used in the ink-jet image forming process described above, and the conventionally used plain paper such as copying paper and bond paper is preferably used. Of course, coated paper specially prepared for ink-jet recording, or transparent films for OHP may also be preferably used. Besides, general-purpose woodfree paper and glossy paper may also be preferably used.

Method for Applying the Liquid Composition

Although the liquid composition can be applied to the recording medium by, for example, a sprayer, roller or the like, an ink-jet system is preferably used to apply the liquid composition selectively and evenly only to the image-forming region including or not including the vicinity region. Here, various kinds of ink-jet recording systems may be used, but particularly preferable is a system in which an ink droplet is ejected by a bubble generated by thermal energy.

<Ink Jet Recording Apparatus>

Next, an ink jet recording apparatus according to the present invention will be described. The ink jet recording apparatus according to the present invention is characterized by comprising an ink containing part in which the anionic or cationic water-based ink containing the coloring material is contained, a first recording unit having an ink jet head to discharge the ink, a liquid composition-containing part which contains the liquid composition as described above, according to the present invention, preferably, the liquid composition in which the fine particles electrified on the surface thereof in the polarity opposite to that of the water-based ink as described above is contained in the dispersion state, and a second recording unit having the ink jet head to discharge the liquid composition.

FIG. 1 is a diagrammatic perspective view showing an example of a schematic constitution of the ink jet printer to record the output, having the above-described feature. In FIG. 1, a reference numeral 1 is a cartridge constituting a print head for carrying out printing by discharging the ink and the reference numeral 2 is the cartridge constituting a liquid composition-discharging head to discharge the liquid composition. In the example illustrated, 4 pieces of cartridges 1 for printing by using inks of different colors and 1 piece of cartridge 2 to discharge the liquid composition are used. The cartridges 1 for printing has a structure in which an ink tank part and ink discharge part (the printing part) are mounted on a top part and a bottom part, thereof, respectively. The cartridge 2 to discharge the liquid composition has the structure in which a liquid composition tank part and a liquid composition discharge part are mounted on the top part and the bottom part, thereof, respectively. In addition, these cartridges 1 and 2 have connectors to receive actuating and other signals. The reference numeral 3 is a carriage.

On the carriage 3, 4 pieces of the head cartridges (print head) 1 for printing by using inks of different colors and 1 piece of the head cartridge (liquid composition discharge head) 2 to discharge the liquid composition are mounted by positioning. On the other hand, the carriage 3 has a connector holder for transmit a signal and the like to actuate each of the print head 1 and the liquid composition discharge head 2 and is connected electrically to each of the head cartridges 1 and 2 through the connector holder.

Each print head 1 contains inks of different colors each, for example, inks of yellow (Y), magenta (M), cyan (C), and black (B). In this figures, the head cartridges (print head) 1Y, 1M, 1C, and 1B, in this order from the left side of the illustration, for printing each ink of yellow, magenta, cyan, and black are mounted and, on the right side end, the head cartridge (liquid composition discharge head) 2, in which the liquid composition as described above is contained, to discharge the liquid composition is mounted.

In FIG. 1, the reference numeral 4 is a scanning rail extended to a main scanning direction of the carriage 3 and supporting the carriage slidably and the reference numeral 5 is an actuating belt transmitting an actuating force to reciprocate the carriage 3. On the other hand, the reference numerals 6, 7, and 8, 9 are all pairs of conveying rollers arranged before and after a position of printing by the print head to convey the recording medium 10 by holding it. The recording medium 10 such as paper is guided and supported in a state of pressing to a platen (not illustrated) to regulate a printing face to flat in the part of the printing position. Here, a discharge port face of each of the head cartridge (head) 1 and 2, which is mounted on the carriage 3, is adapted to be positioned between the rollers 7 and 9 projecting downward from the carriage 3 for conveying the recording medium and faces oppositely along with the recording medium 10 pressed to the guide face of the platen (not illustrated).

Around a home position set in the left side outside the print area of the ink jet printing apparatus of the figure, a recovery unit 11 is installed. In the recovery unit 11, 4 pieces of caps 12 corresponding to the print head (head cartridges) 1Y, 1M, 1C, and 1B and 1 piece of the cap 13 corresponding to 1 piece of the liquid composition discharge head (head cartridge) 2, in which the liquid composition as described above is contained, to discharge the liquid composition are installed vertically movably up and down. And, when the carriage 3 is in the home position, caps 12 and 13 corresponding to the faces forming the discharge ports of each head 1 and 2 are fitted by pressing and thus, the discharge ports of each head 1 and 2 are sealed (capped). By capping, thickening and adhering of the ink by evaporation of a solvent of the ink in the discharge port is prevented resulting in prevention of occurrence of discharge failure.

On the other hand, the recovery unit 11 has a suction pump 14 communicated with each cap 12 and the suction pump 15 communicated with cap 13. These pumps 14 and 15 are, when discharge failure occurs in the print head 1 and the liquid composition discharge head 2, used for capping those faces forming the discharge ports with caps 12 and 13 to execute sucking and recovering actions. In addition, in the recovery unit 11, 2 pieces of wiping members (blades) 16 and 17 made of an elastic member such as a rubber are installed. The blade 16 is held by a blade holder 18 and the blade 17 is held by a blade holder 19.

In the schematic diagram shown in FIG. 1, both the blade holders 18 and 19 as described above are moved up and down by a blade moving mechanism (not illustrated) actuated by using a motion of the carriage 3 and hence, the blades 16 and 17 as described above move between a protruded position (a wiping position) to wipe a foreign matter and the ink, which have attached to the faces forming the discharge ports of the heads (cartridge) 1 and 2, and a retreated (moved down) position (a stand by position) to cause no contact with the faces forming the discharge ports. In this occasion, the blade 16 to wipe the print head 1 and the blade 17 to wipe the liquid composition discharge head 2 are constituted independently from each other to move up and down individually.

And, in FIG. 1, when the carriage 3 moves from the right side (print area side) to the home position side or moves from the home position side to the print area side, the blade 16 abuts to the faces forming the discharge port of each print head 1 and the blade 17 abuts to the faces forming the discharge port of the liquid composition discharge head 2 to move relatively resulting in a wiping motion of those faces forming the discharge ports.

Figure 2:
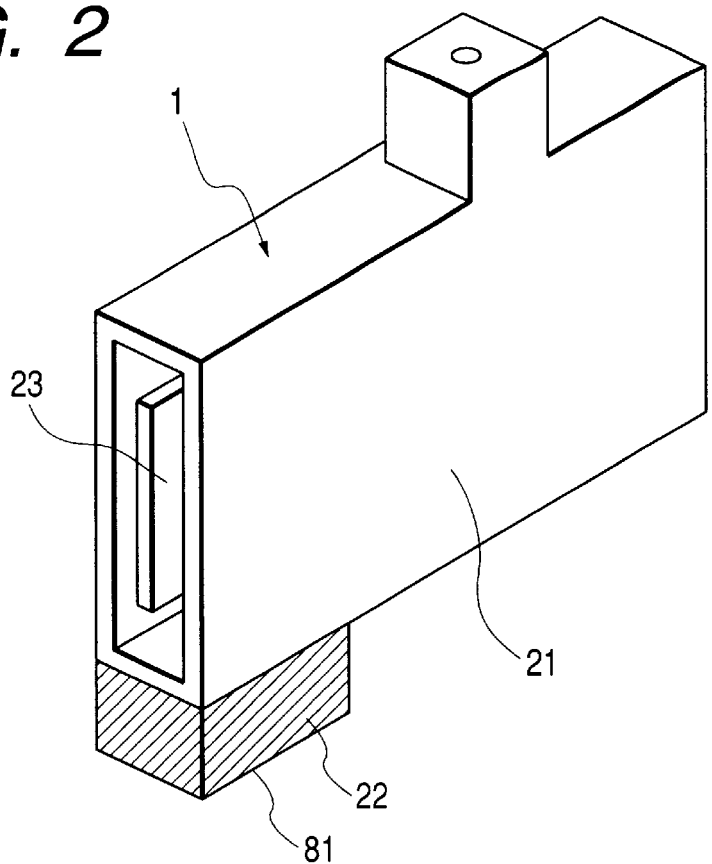
FIG. 2 is a schematic perspective view of a head cartridge in FIG. 1.

FIG. 2 is the diagrammatic perspective view showing the print head (head cartridge) 1 of the structure made by integrating the ink discharge part with the ink tank. Incidentally, the liquid composition discharge head 2, excluding that the liquid stored and used is the liquid composition, has the substantially same constitution as that of the print head 1. In FIG. 2, the print head 1 has the ink tank part 21 and the ink discharge part (print head part) 22 are mounted on the top part and the bottom part, thereof, respectively, and receive an actuating and other signals to actuate the ink discharge part 22 and also has a head side connector 23 to output an ink residue detection signal. This connector 23 is installed in the position close to the ink tank part 21. The print head cartridge 1 has s face 81 forming the discharge port in a bottom face side (the recording medium 10 side) in FIG. 2 and the print head 1 has the face 81 forming the discharge port, a plurality of the discharge ports have been formed. In a liquid path part communicating with each discharge port, a discharge energy generating element is arranged to generate energy necessary for discharge of the ink.

The print head (head cartridges) 1 as described above is ink jet printing means to print by discharging the ink and constituted by the ink discharge part 22 and an ink jet cartridge integrating with the ink tank 21 and exchangeable. This print head 1 is the ink jet printing means to discharge the ink by using thermal energy and comprises an electrothermal converter to generate thermal energy. Incidentally, the print head 1 as describe above uses a change of pressure created by growth and reduction of bubbles generated by film boiling caused by thermal energy, which is applied by the electrothermal converter as describe above, to discharge the ink from the discharge part for printing.

Figure 3:
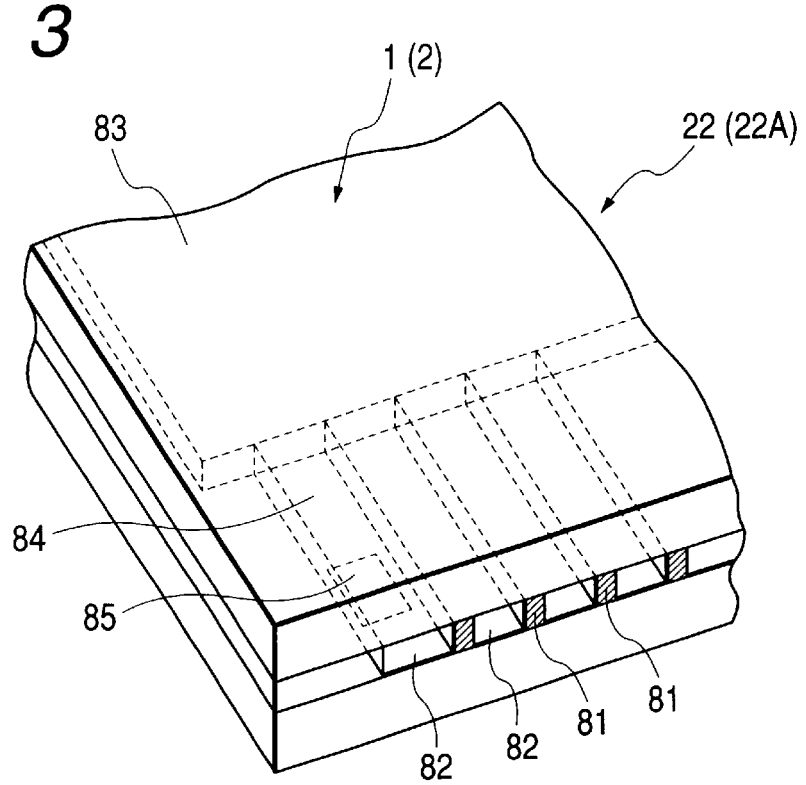
FIG. 3 is a partial perspective view schematically showing the structure of the ink-ejection part of the head cartridge in FIG. 1.

FIG. 3 is a partial perspective view showing diagrammatically the structure of the ink discharge part 22 (the liquid composition discharge part 22A) of the print head 1 (the liquid composition discharge head 2). In FIG. 3, on the face 81 forming the discharge port facing the recording medium (print paper and the like) through a predetermined space (for example, about 0.5 to 2.0 mm), a plurality of the discharge ports 82 is formed in a predetermined pitch and along with a wall face of the liquid path 84 making a communication of a common liquid chamber 83 with each discharge ports 82, the electrothermal converter (heat-generating resistor) 85 is installed to generate energy for ink discharge. The plurality of the discharge ports 82 is arranged in a positional relation to align along with a direction crossing to a moving direction (the main scanning direction) of the print head cartridge 1. As mentioned above, the print head 1 is constituted as that the corresponding electrothermal converter 85 is actuated (run an electric current) on the basis of an image signal or a discharge signal to cause film boiling of the ink in the liquid path 84 and then, the ink is discharged from the discharge ports 82 by pressure created at the time.

Here, the ink holding ink and the tank containing the liquid composition (hereinafter both are also called simply "ink tank") provided in the print head cartridges 1 and 2 are preferably made from a material that is resistant to chemicals, since it comes in contact with ink or a liquid composition. Materials that satisfy the requirement, and are available in general include resins such as polyolefin resins, polyvinylchloride, polyvinylidene chloride, silicone resins, ethylene-vinyl acetate copolymer, ABS resin, polyacetal, nylon, unsaturated polyester resins, PET, and aramid resins, styrene butadiene rubber (SBR), butadiene rubber, chloroprene, nitrile rubber, butyl rubber, EPDM, urethane rubber, silicone rubber, acryl rubber, epichlorohydrin rubber, and fluorine rubber. These resins and synthetic rubbers contain, in addition to the constituting chemical substances, various additives such as stabilizers, UV absorbing agents, and antioxidants in appropriate amounts in accordance with the purpose.

These additives may be eluted into the ink or liquid composition, and react with the components of the ink or liquid composition to form insoluble matter. Among the additives, especially, fatty acids or fatty acid derivatives, when eluted into the ink or liquid composition, tend to form precipitate by itself with the environmental factors such as temperature, or by reaction with the ions dissolved in the ink or liquid composition to form insoluble fatty acid salts, and such insoluble precipitate may clog the filter or the ejection orifice to inhibit ink flow. Thus, preferable countermeasure to prevent such insoluble precipitation include, for example, reduction of the content of additives in the resin with which the ink tank is made, selection of hard-to-elute materials, modification of solvent composition of the ink or liquid composition, and reduction of the content of reactive components in the ink or liquid composition.

Figure 4A:
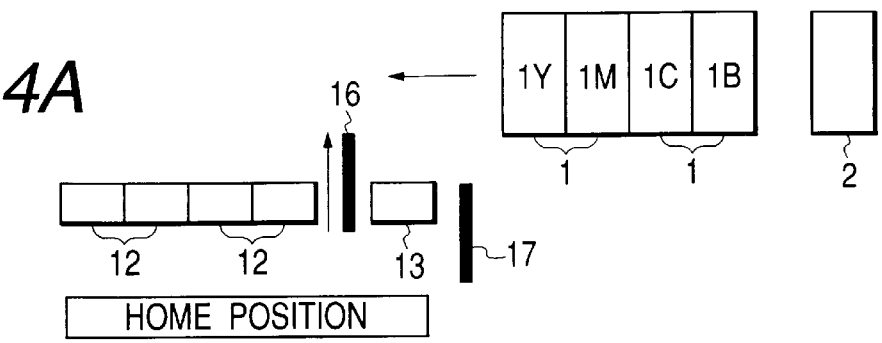
FIGS. 4A, 4B, 4C, and 4D schematically illustrate wiping operation of the ink-jet printing apparatus in FIG. 1.
Figure 4B:
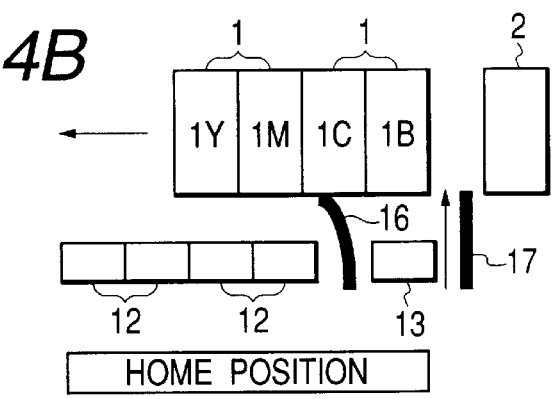

FIGS. 4A, 4B, 4C and 4D to FIGS. 6A, 6B, 6C and 6D are the diagrammatic figures showing the wiping action of the ink jet printing apparatus and described above. FIGS. 4A to 4D show an occasion in which the carriage 3 moves from the print area side to the home position side. As shown in FIG. 4A, the print head 1 and the liquid composition discharge head 2 on the carriage 4 moves from the right side (print area side) to the home position. Then, as shown in FIG. 4B, first, the blade 16 for the ink between the cap 12 for the ink and the cap 13 for the liquid composition moves up to wipe each print head 1Y, 1M, 1C, and 1B in this order in accordance with movement of the carriage 3.

Figure 4C:
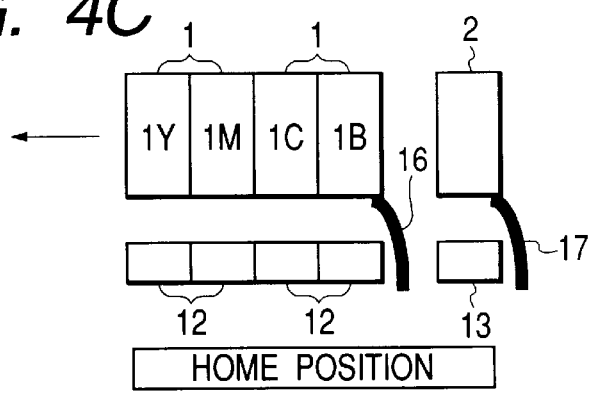
Figure 4D:
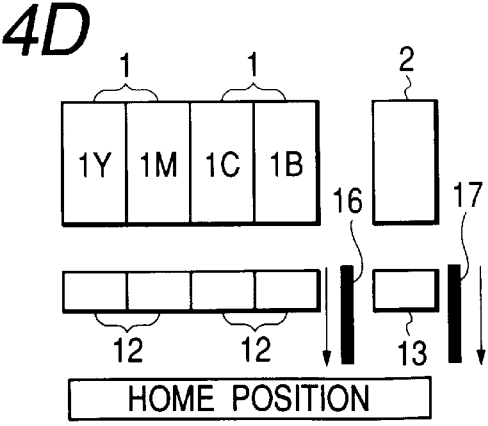

In addition, as FIG. 4C, after each print head 1 passes through a top of the blade 1 for the liquid composition, the blade 17 for the liquid composition moves up to wipe the faces forming the discharge port of the liquid composition discharge head 2 as shown in FIG. 4D. The blade 16 for the ink wipes the fourth print head 1 and after the blade 17 for the liquid composition path completes to wipe the liquid composition discharge head 2, both the blades 16 and 17 moves down to stands by at the stand-by position. In FIGS. 4A to 4D, a constitution is that when the carriage 3 moves from the right side (print area) to the home position having the recovery unit 11 in FIG. 1, wiping by the blades 16 and 17 is carried out. However, a wiping direction is not restricted to this, but as shown in FIGS. 5A to 5D, the constitution may be that when the carriage 3 moves from the home position side to the right side (print area side), wiping is carried out.

Figure 5A:
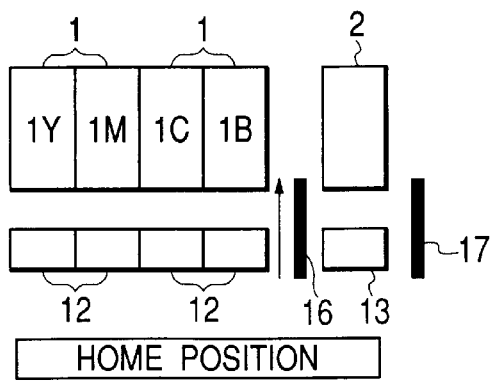
FIGS. 5A, 5B, 5C, and 5D schematically illustrate wiping operation of the ink-jet printing apparatus in FIG. 1.
Figure 5B:
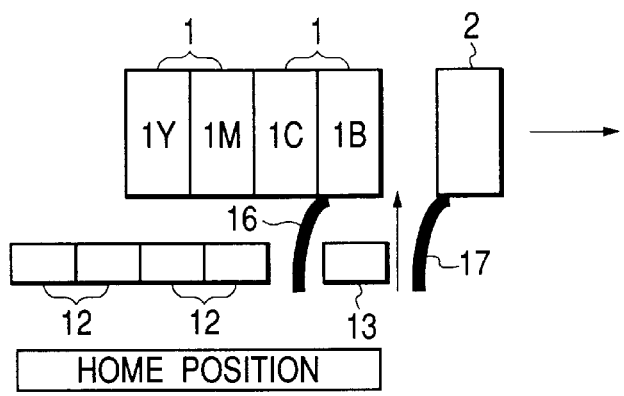
Figure 5C:
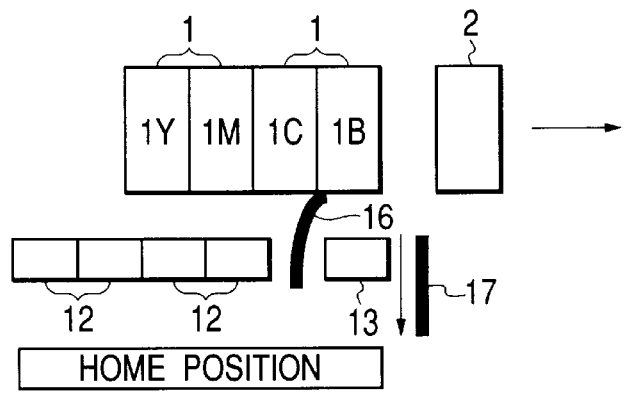
Figure 5D:
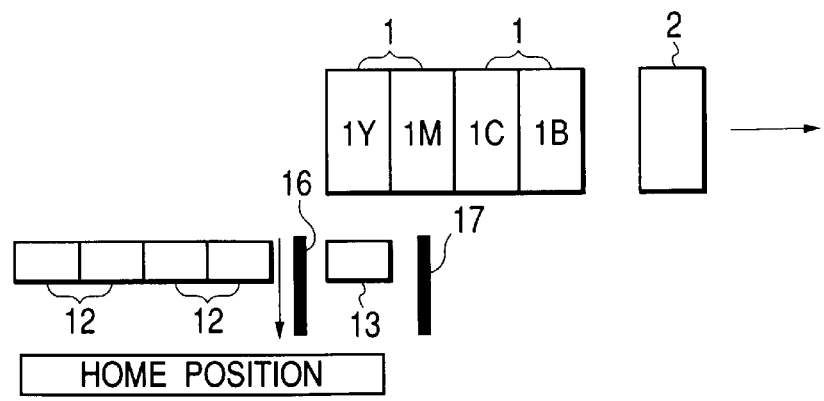

In FIGS. 5A to 5D, as shown in FIG. 5A, the blade 16 for the ink and the blade 17 for the liquid composition are moved up simultaneously and the carriage 3 is moved to the right direction (to print area side) to wipe simultaneously the print head 1 and the liquid composition discharge head 2 (FIG. 5B), immediately after the completion of wiping of the liquid composition discharge head 2, the blade 17 for the liquid composition is moved down to stand by and the blade 17 for the ink carries out wiping of the print head 1 as it is (FIG. 5C). Finally, as shown by FIG. 5D, when wiping of all the print head 1 is completed, the blade 16 for the ink is moved down to complete a series of wiping operations. By employing the wiping direction as described in FIGS. 5A to 5D, the following risk can be eliminated: the droplet removed by wiping to attach to the blades 16 and 17 splashes toward the carrying part of the recording medium 10 by elasticity of the blade to stain undesirably the recording medium 10.

Figure 6A:
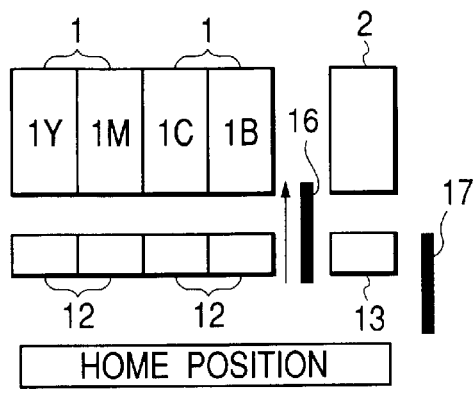
FIGS. 6A, 6B, 6C, and 6D schematically illustrate wiping operation of the ink-jet printing apparatus in FIG. 1.
Figure 6B:
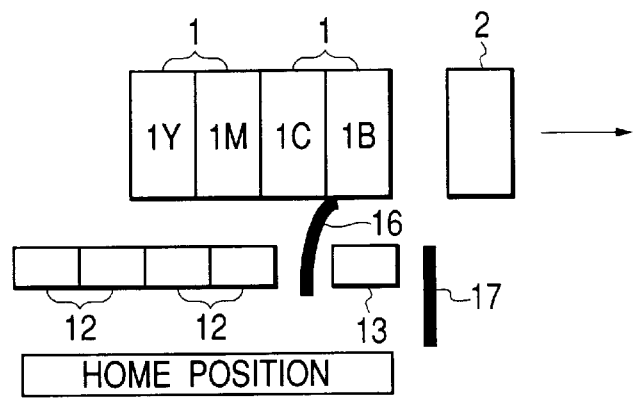
Figure 6C:
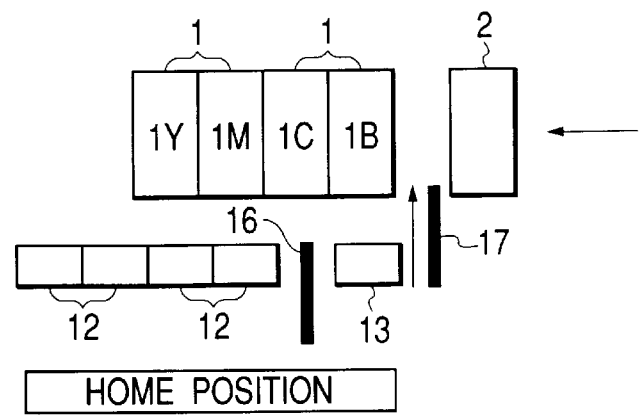
Figure 6D:
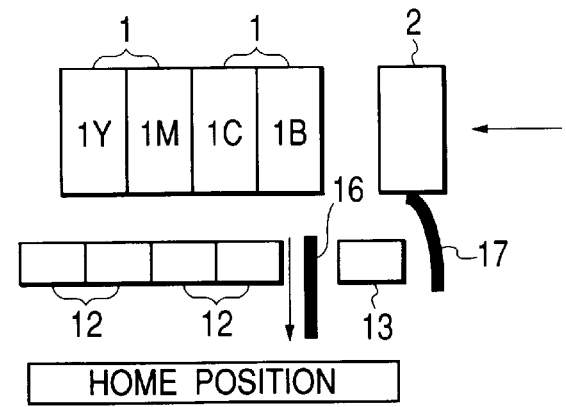

In addition as shown in FIGS. 6A to 6D, the wiping direction of the print head 1 may be made different from the wiping direction of the liquid composition discharge head 2. In FIGS. 6A to 6D, for example, as shown in FIG. 6A and FIG. 6B, it is possible that when the carriage 3 moves from the home position side to the right direction (print area side), the print head 1 is wiped by the blade 16 for the ink and as shown in FIG. 6C and FIG. 6D, when the carriage 3 moves from the print area side to the home position side, only the liquid composition discharge head 2 is wiped by the blade 17 for the liquid composition. By employing such wiping direction, failures (risk) capable of elimination or reducible greatly are that the ink splashed by the elastic force of the blade 16 attaches to the liquid composition discharge head 2 and on the contrary, the liquid composition splashed by the elastic force of the blade 17 attaches to the print head 1.

On the other hand, in FIG. 1, the cap 12 for the print head 1 is separated the cap 13 for the liquid composition discharge head 2 to make independent (for an exclusive use) and the suction pumps 14 and 15 connected to these caps 12 and 13 are separated each other to make independent (for an exclusive use) for the print head 1 and the liquid composition discharge head 2. By this, in these caps 12 and 13 and the pumps 14 and 15, the ink is not contacted with the liquid composition having a reactivity with the ink to allow treating waste solutions derived from these resulting in possibility to keep a high reliability.

Figure 7:
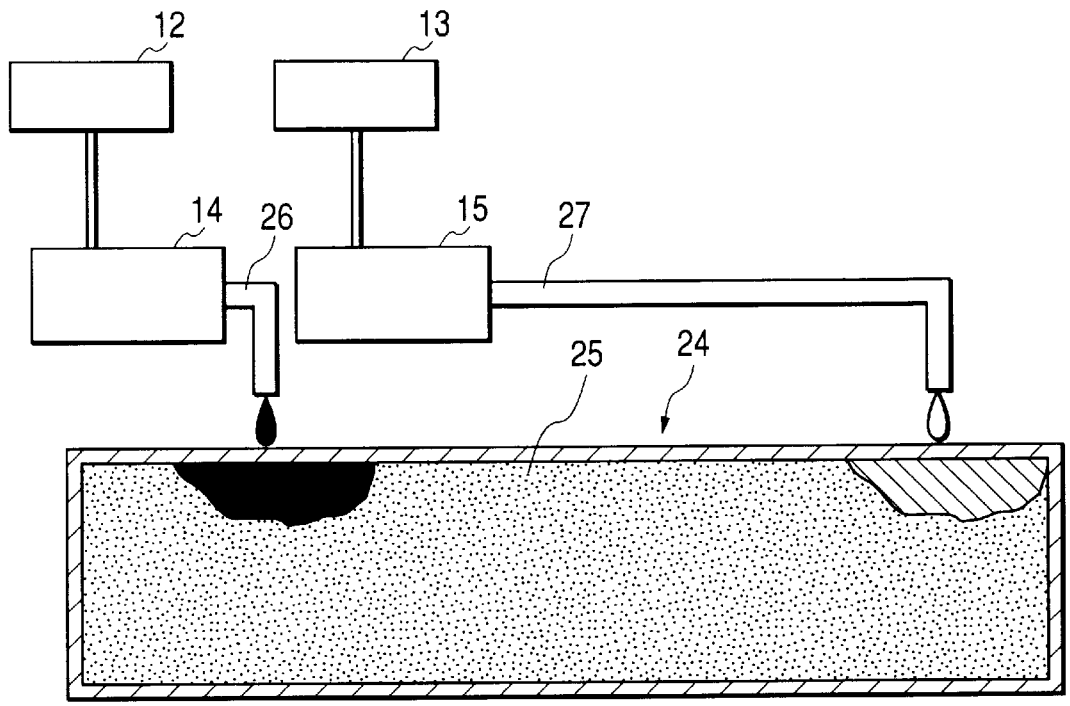
FIG. 7 schematically illustrates the waste liquid recovery system of the ink-jet printing apparatus in FIG. 1.

FIG. 7 is the diagrammatic figure showing a recovery line for collecting the ink and the liquid composition exhausted from the pumps 14 and 15 to a waster ink tank. In FIG. 7, the waste ink sucked from the print head 1 by the suction pump 14 communicated with the cap 12 and the waste solution sucked from the liquid composition discharge head 2 by the suction pump 15 communicated with the cap 13 are collected to contain in a waste solution tank 24 through each independent path to prevent leak out the printing apparatus.

The waste solution tank 24 as described above is constituted as adapted to fill a porous absorber 25 therein to absorb and hold the waste solution in the absorber 25. The waste solution tank 24 is installed in a main body of the printing apparatus. In FIG. 7, a waste ink pipe 26 from the suction pump 14 for the print head 1 and the waste ink pipe 27 from the suction pump 15 for the liquid composition discharge head 2 are connected, as shown in the figure, in the position of both ends of the waste solution tank 24 with a distance from each other. By such design as described above, the liquid composition contacts with the ink in the waste solution tank 24 limiting to the state where the solution is enough absorbed in the absorber 25 and therefore, the quantity of the liquid, which can be held by the porous absorber 25, can be sufficiently kept.

Figure 8:
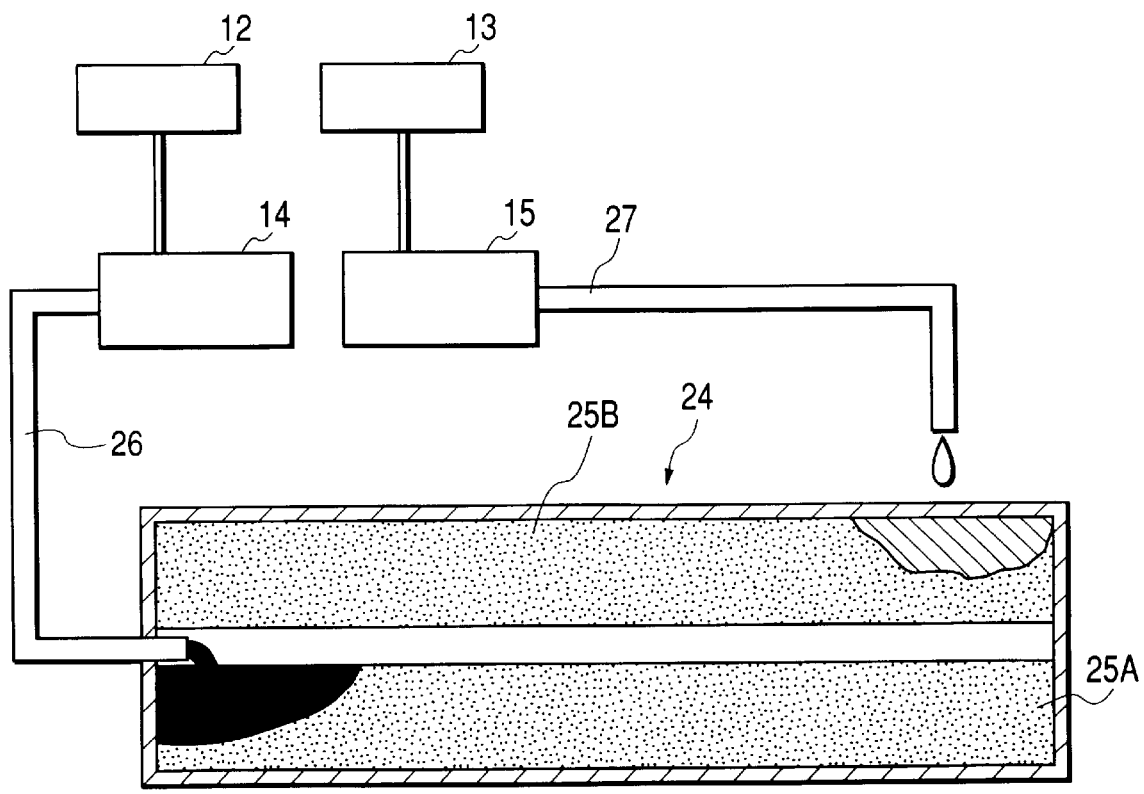
FIG. 8 schematically illustrates a partially modified waste liquid recovery system in FIG. 7.
Figure 9:
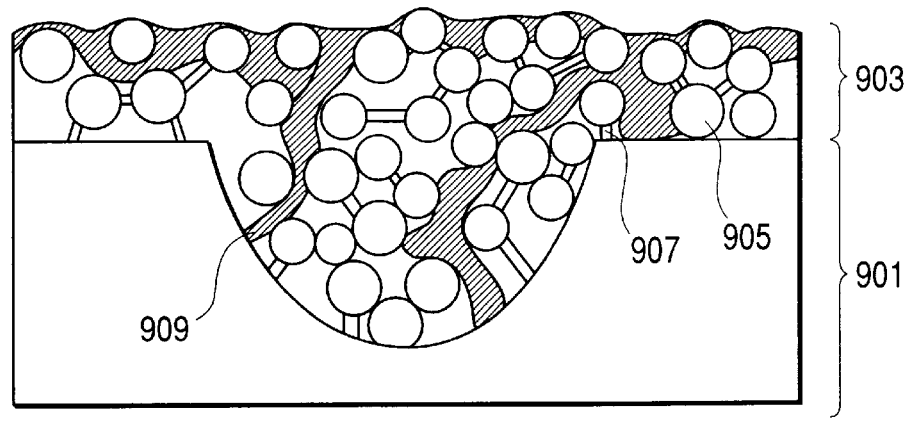
FIG. 9 is a schematic cross-sectional view illustrating the state of a colored portion when ink-jet recording is carried out on coat paper.

FIG. 8 is the diagrammatic view showing, in the waste solution-collecting line of FIG. 7, the waste solution-collecting line with the constitution in which the absorber 25 in the waste solution tank 24 is arranged in 2 stages the top and the bottom, the ink is absorbed by the absorber 25A of a bottom stage, and the liquid composition is absorbed by the absorber 25B of a top stage. According to the constitution of FIG. 8, in the case where the absorber 25A of the bottom stage brims, the dye in the ink is reacts to the absorber 25B of the top stage to be fixed by the absorber 25B of the top stage and the liquid composition absorbed therein and thus, the ink does not brim and not stain the inside and outside of the printing apparatus by brimming of the ink.

Another ink jet recording apparatus of the present invention is characterized by comprising the ink containing part in which the anionic or the cationic water-based ink containing the coloring material is contained, the liquid composition-containing part which contains the liquid composition as described above, according to the present invention, preferably, the liquid composition in which the fine particles electrified on the surface thereof in the polarity opposite to that of the water-based ink as described above is contained in the dispersion state, and the ink jet head to discharge independently each of the water-based ink contained in the ink containing part as described above and the liquid composition contained in the liquid composition containing part as described above. These will be described below.

Figure 10:
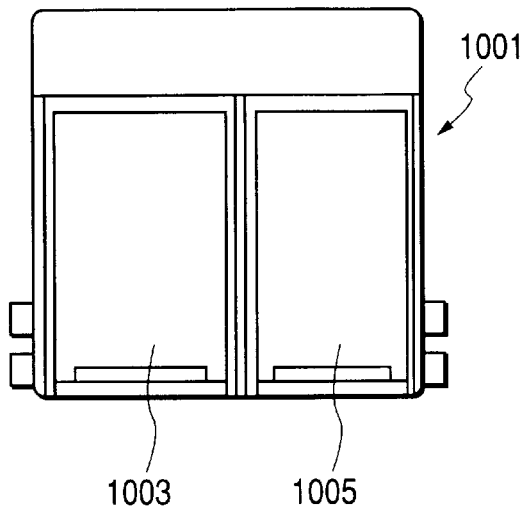
FIG. 10 is an outlined figure showing one embodiment of an ink cartridge according to the invention.
Figure 11:
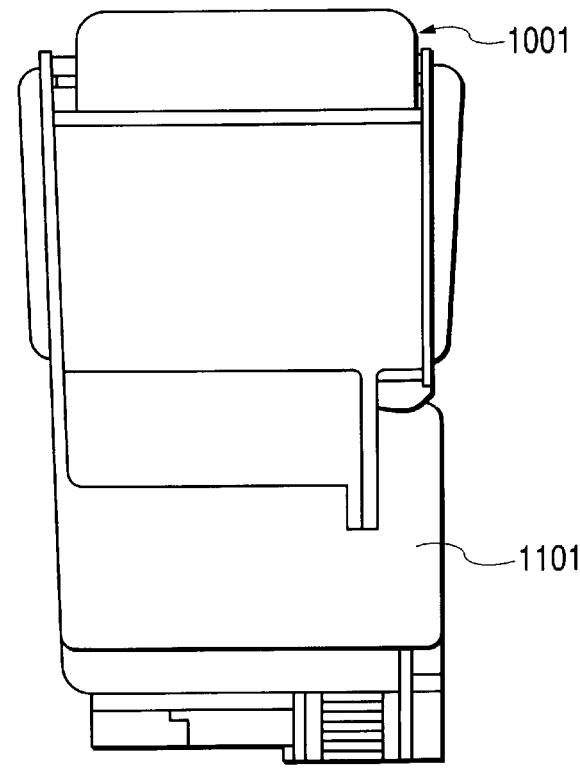
FIG. 11 is an outlined figure of a recording head incorporated with the ink cartridge in FIG. 10.

FIG. 10 shows the example of such cartridge 1001 and in the figure, the reference numeral 1003 is the ink containing part which contains the ink and the reference numeral 1005 is the liquid composition-containing part which contains the liquid composition. The cartridge is, as shown in FIG. 11, constituted to be detachably to the recording head 1101 to discharge each of the ink and the liquid composition and in the state of the cartridge 1001 mounted on the recording head 1101, constituted to supply the liquid composition and the ink to the recording head 1101.

Figure 15:
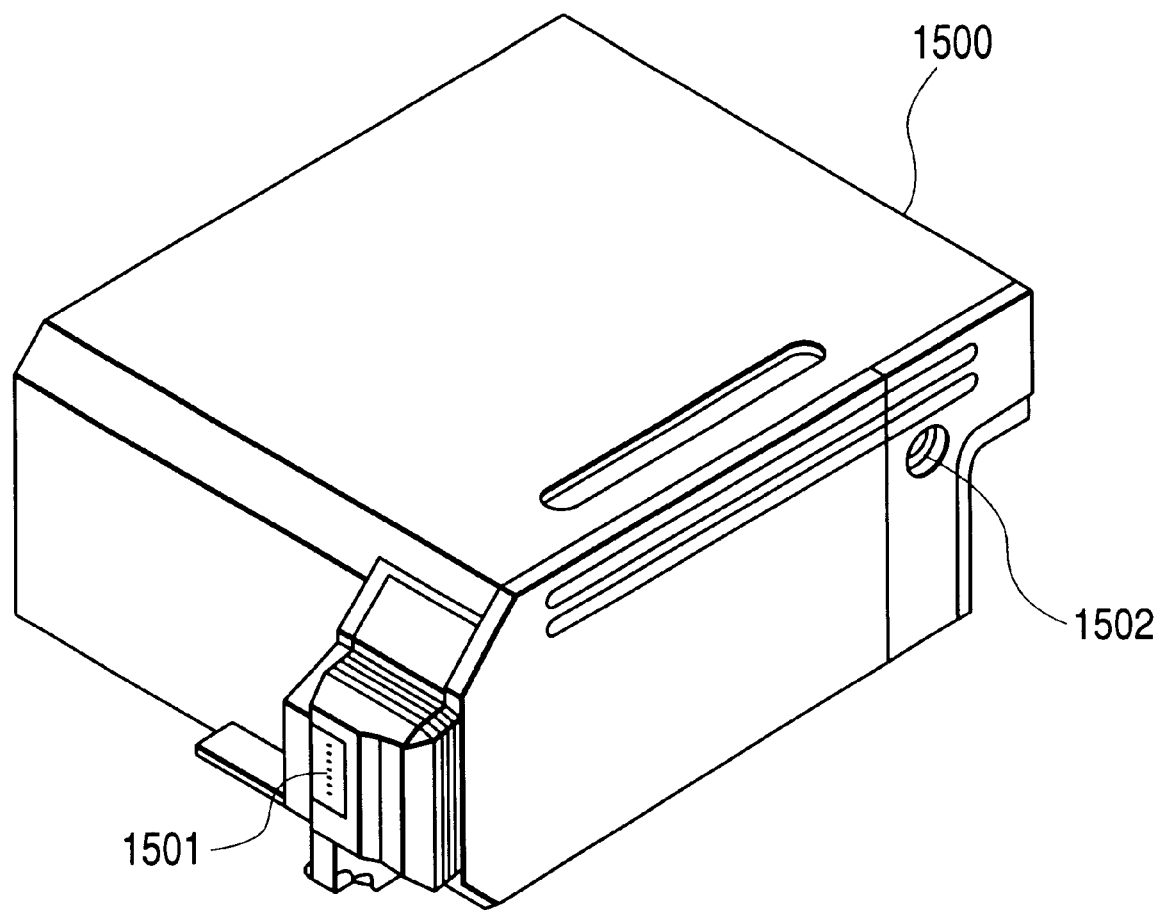
FIG. 15 is a perspective view of a recording unit.

The ink jet recording apparatus used in the present invention is not restricted to those in which the head and ink cartridge is installed separately as described above and as shown in FIG. 15, that in which those have been integrated are preferably used. In FIG. 15, the reference numeral 1500 is the recording unit and constituted as that the ink containing part, such as the ink absorber, which contains the ink is contained and the ink in such ink absorber is discharged from the head part 1501, having a plurality of orifices, as the ink droplet. As material of the ink absorber, for example, polypropylene and polyurethane can be used. The reference numeral 1502 is an atmosphere communication port to make communication of the inside of the recording unit with atmosphere.

Figure 12:
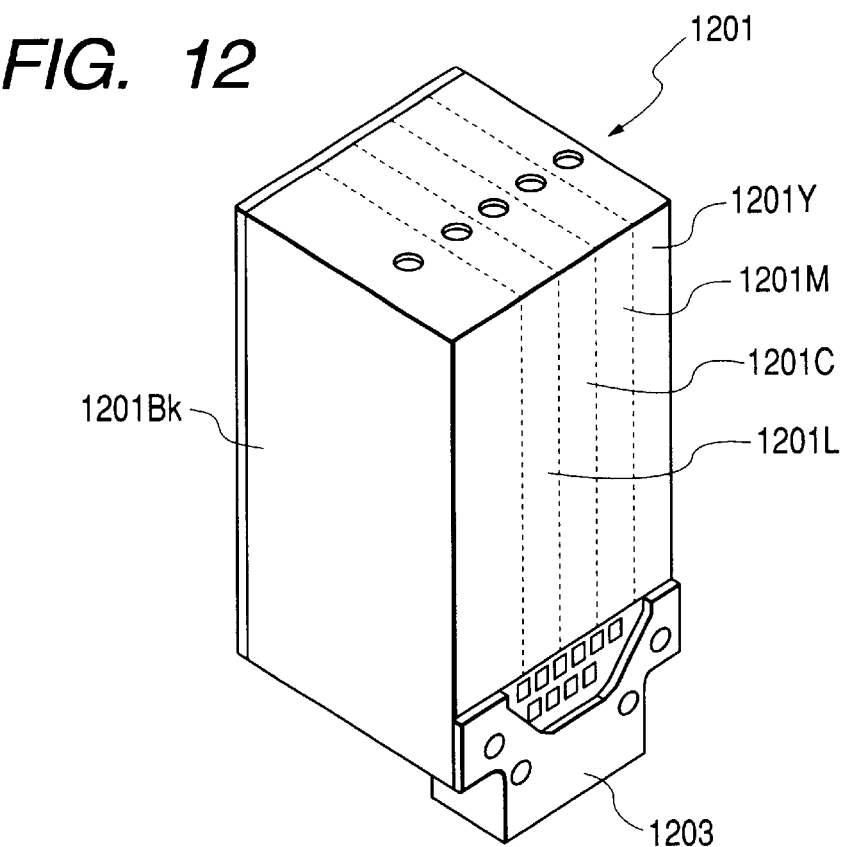
FIG. 12 is an outlined figure showing one embodiment of a recording unit according to the invention.

In addition, as other embodiment of the recording unit used in the present invention, the recording unit, in which the ink and the liquid composition is contained in each containing part in 1 piece of the ink tank and the recording head for discharge of each of the ink and the liquid composition is integrally installed, and specifically, for example, as shown in FIG. 12, the recording unit 1201, in which the liquid composition is contained in the containing part 1201L, black in is in the containing part 1201Bk, and color inks of yellow, cyan, and magenta inks are contained in color ink containing part 1201Y, 1201C, and 1201M, respectively, and the recording head 1203 constituted by separating the ink flow path is installed to be able to discharge each ink individually, can be exemplified.

Figure 16:
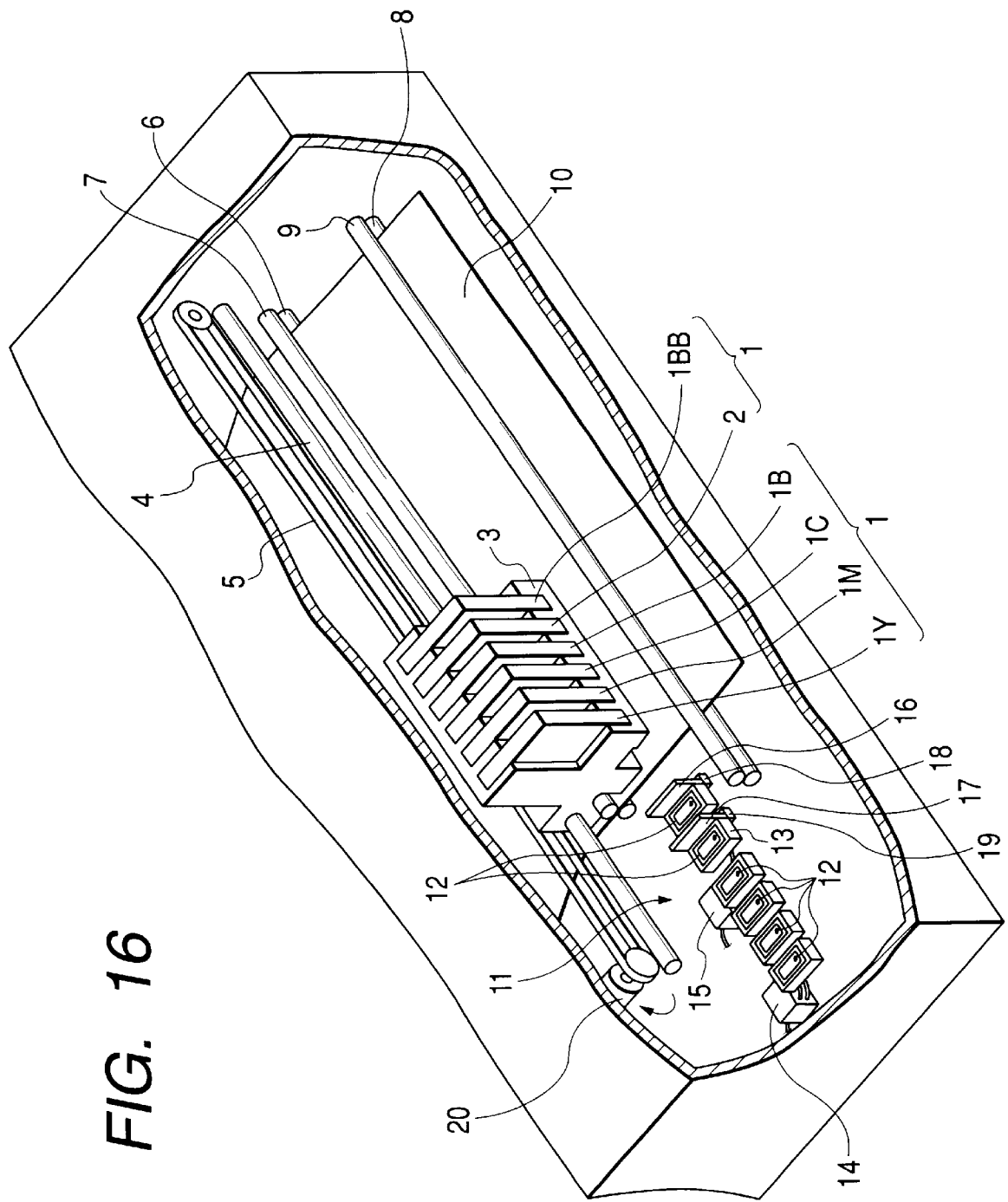
FIG. 16 is a partially ruptured perspective view schematically showing one embodiment of an ink-jet printing apparatus according to the invention.

FIG. 16 is the diagrammatic perspective view showing the schematic constitution of other embodiment of the ink jet recording apparatus according to the present invention. In FIG. 16, he reference numeral 4 the scanning rail extended to the main scanning direction of the carriage 3 and supporting the carriage slidably and the reference numeral 5 is the actuating belt transmitting the actuating force to reciprocate the carriage 3. On the other hand, the reference numerals 6, 7, and 8, 9 are all pairs of conveying rollers arranged before and after the position of printing by the print head to convey the recording medium 10 by holding it. The recording medium 10 such as paper is guided and supported in the state of pressing to the platen (not illustrated) to regulate the printing face to flat in the part of the printing position. Here, the discharge port face of each of the head cartridge (head) 1 and 2, which is mounted on the carriage 3, is adapted to be positioned between the rollers 7 and 9 protruding downward from the carriage 3 for conveying the recording medium and faces oppositely along with the recording medium 10 pressed to the guide face of the platen (not illustrated).

In FIG. 16, 6 pieces of the head cartridges in total are positioned to mount on the carriage 3. In this example, a print head of yellow 1Y, the print head of magenta 1M, the print head of cyan 1C, and the print head of black 1B, the liquid composition discharge head 2, a second print head of black 1BB in this order from the left end side to the right end side of the illustration on the carriage 3. The liquid composition discharge head 2 is that to discharge the liquid composition having reactivity with the coloring material in the ink to the recording medium 10. Incidentally, the second print head of black EBB in the right side is the print head using black ink used in subscanning print by reciprocating printing. In other words, the following constitution is applied: the liquid composition discharge head 2 is arranged in a next position (a right adjacent position) of the print head of black 1B and the print head of black 1BB as described above is arranged in further next position (a right end).

In FIG. 16, the recovery unit 11 is installed in the left side of the print area and in the recovery unit 11, corresponding to the head cartridges 1 and 2, in the order from right to left, the cap 12 is serially arranged to cap the print heads 1Y, 1M, 1C, and 1B, the cap 13 is arranged in the next position (the right adjacent position) to cap the liquid composition discharge head 2, the cap 12 is arranged in the further next position (right end) to cap the second print head of black 1BB. And, each cap is installed vertically movable up and down. When the carriage 3 is in the home position, caps 12 and 13 corresponding to the faces forming the discharge ports of each head 1 and 2 are fitted by pressing and thus, the discharge ports of each head 1 and 2 are sealed (capped). By this, thickening and adhering of the ink by evaporation of the solvent of the ink in the discharge port is prevented resulting in prevention of occurrence of discharge failure.

The recovery unit 11 comprises the suction pump 14 communicated with each cap 1 and 2 and the suction pump 15 communicated with the cap 3. These pumps 14 and 15 are, when discharge failure occurs in the print head 1 and the liquid composition discharge head 2, used for capping those faces forming the discharge ports with caps 12 and 13 to execute sucking and recovering actions. The blade 17 for the liquid composition discharge head 2 is arranged between the cap 13 for the liquid composition of the fifth from the left side and the cap 12 for the black ink of the sixth (the right side) and the blade 16 for each print head 1 is arranged in the right side (print area side) of the cap 12 of the right end.

In addition, the blade 16 is held by the blade holder 18 and the blade 17 is held by the blade holder 19. In this aspect, the blade holders 18 and 19 are moved up and down by a blade moving mechanism (not illustrated) actuated by using the motion of the carriage 3 and hence, the blades 16 and 17 move up and down between the protruded position (the wiping position) to wipe the foreign matter and the ink, which have attached to the faces forming the discharge ports of the heads 1 and 2, and the retreated position (stand by position) to cause no contact with the faces forming the discharge ports. In this occasion, the blade 16 to wipe the print head 1 and the blade 17 to wipe the liquid composition discharge head 2 are constituted independently from each other to move up and down individually.

FIGS. 17A to 17F are the diagrammatic figure showing the wiping action of the ink jet recording apparatus of FIG. 16. In FIGS. 17A to 17F, as shown in FIG. 17A, after the blade 16 for the printing head protrudes (moves up), each head mounted on the carriage 3 moves from the right side (print area side) to the home position. The blade 16 for the printing head moved up, as shown in FIG. 17B, wipes sequentially the printing head 1 according to the motion of the carriage 3 to the left hand direction. And, as shown in FIG. 17C, in the point where the liquid composition discharge head 2 arrives a front position (adjacent right position) of the blade 16 for the printing head, the blade 16 retreats (moves down) to the stand by position to prevent contact of the blade 16 with the liquid composition discharge head 2.

In the point where the carriage 3 moves leftward and the liquid composition discharge head 2 passes through the blade 6 for the printing head, as shown in FIG. 17D, both the blade 16 for the printing head and the blade 17 for the liquid composition discharge head are protruded (moved up). And, according to the leftward motion of the carriage 3, as shown in FIG. 17E, wiping the liquid composition discharge head 2 by the blade 17 and wiping the right end print head 1BB by the blade 16 are simultaneously carried out. Wiping of all the heads 1 and 2 has been finished, as shown in FIG. 17F, both the blade 16 and the blade 17 are retreated to stand by at the stand by position.

The examples of FIG. 16 and FIGS. 17A to 17F are adapted to be that when the carriage 3 moves from print area side (the right side) to the home position where the recovery unit 11 is located, wiping is carried out by the blade 16 and 17. However, the wiping direction is not restricted to this, but wiping may be carried out during motion from the home position to the right side (print area side).

The ink jet recording apparatus of FIG. 16 is constituted by discharging the liquid composition, according to the present invention, having reactivity with the coloring material in the ink from the liquid composition discharge head 2 to the recording medium 10 to contact with the ink discharged from each print head 01 on the recording medium 10 resulting in forming the recorded matter. On the recording medium 10, by reaction of the coloring material in the ink to the liquid composition, the coloring material in the ink adsorbs to the fine particles in the monomolecular state and image formation is carried out by the fine particles and therefore, the image excellent in coloration and color evenness can be yielded.

In the above, the recording apparatus used in the present invention is explained referring to an ink jet recording apparatus discharging the ink droplet by applying thermal energy to the liquid composition and the ink. However, the ink jet recording apparatus of the piezoelectric system using a piezoelectric element can be similarly employed. In addition to the above-described ink-jet recording apparatuses, it may be used an ink-jet recording apparatus having a constitution as disclosed in Japanese Patent Application Laid-Open No.10-146991, and having a head-wiping blade that moves in a direction different from that of the above ink-jet recording apparatus.

EXAMPLES

The present invention will be described more specifically with Examples and Comparative Examples. In the description, parts and % are based on weight unless any specific remark is given.

First, the production of a liquid composition of the invention is described.

Liquid compositions A, B, C, and D of the present invention were prepared by mixing and dissolving the components shown below, and filtering the resulting solution under pressure through a membrane filter with the pore size of 1 $\mu$m (trade name, Fluoropore filter: manufactured by Sumitomo Electric Industries Ltd.).

Synthesis Example of Hydrated Alumina

Aluminum dodeoxide was produced by a method disclosed in U.S. Pat. No. 4,242,271. Then, the aluminum dodeoxide was hydrolyzed by a method disclosed in U.S. Pat. No. 4,202,870 to produce an alumina slurry. Water was added to the alumina slurry so as to adjust the solid content of the hydrated alumina to 8.2%. The pH of the resulting alumina slurry was 9.7. The pH was adjusted with an aqueous solution of 3.9% nitric acid to obtain colloidal sol under the maturation conditions as shown in Table 1. Then, the thus obtained colloidal sols were dispersed into water respectively, and pH was controlled with the acid shown in Table 1, and finally concentration was conducted so as to be solid content of 20 wt %, to obtain slurries A–D of hydrated aluminum. The hydrated aluminas in those slurries were all positively charged on the surface in water and cationic Furthermore, all the hydrated aluminas in the slurries had flat shape when measured respective samples prepared by dispersing the slurries into ion exchanged water to dilute, and dropping the diluted slurries on a collodion membrane. These hydrates were dispersed in ion exchanged water and put on a collodion membrane dropwise to produce samples for measurement. Observation of the samples by transmission electron microscopy clearly showed that all samples were fine particles of a flat shape.

TABLE 1

| Hydrated alumina slurry | A | B | C | D |
|---|---|---|---|---|
| pH before maturation | 6.0 | 6.0 | 6.0 | 6.0 |
| Maturation temperature (° C.) | 120 | 120 | 120 | 120 |
| Maturation period | 3 hours | 5 hours | 8 hours | 30 hours |
| Maturation apparatus | auto-clave | auto-clave | auto-clave | Auto-clave |
| Acid | Hydro-chloric acid | Nitric acid | Formic acid | Acetic acid |
| pH after maturation | 3.9 | 4.5 | 5.0 | 5.4 |

| Composition of the liquid composition A | |
|---|---|
| Glycerol | 10.0 parts |
| Diethylene glycol | 7.5 parts |
| Hydrated alumina slurry A | 50.0 parts |
| Water | 32.5 parts |

The components were mixed at 3000 rpm for 30 minutes by using an emulsifier-disperser TK Robomix (a product of Tokushu KiKa Kogyo Ltd.), and then centrifuged at 4,000 rpm for 15 minutes to remove coarse particles. The supernatant is used as the liquid composition A.

| Composition of the liquid composition B | |
|---|---|
| 1.5-Pentanediol | 10.0 parts |
| Ethylene glycol | 7.5 parts |
| Hydrated alumina slurry B | 50.0 parts |
| Water | 32.5 parts |

The components were mixed at 3000 rpm for 30 minutes by using an emulsifier-disperser TK Robomix (a product of Tokushu KiKa Kogyo Ltd.), and then centrifuged at 4,000 rpm for 15 minutes to remove coarse particles. The supernatant is used as the liquid composition B.

| Composition of the liquid composition C | |
|---|---|
| Glycerol | 7.5 parts |
| Propylene glycol | 7.5 parts |
| Hydrated alumina slurry C | 50.0 parts |
| Water | 35.0 parts |

The components were mixed at 3000 rpm for 30 minutes by using an emulsifier-disperser TK Robomix (a product of Tokushu KiKa Kogyo Ltd.), and then centrifuged at 4,000 rpm for 15 minutes to remove coarse particles. The supernatant is used as the liquid composition C.

| Composition of the liquid composition D | |
|---|---|
| 2-Pyrrolidone | 7.5 parts |
| Ethylene urea | 7.5 parts |
| Hydrated alumina slurry D | 50.0 parts |
| Water | 35.0 parts |

The components were mixed at 3000 rpm for 30 minutes by using an emulsifier-disperser TK Robomix (a product of Tokushu KiKa Kogyo Ltd.), and then centrifuged at 4,000 rpm for 15 minutes to remove coarse particles. The supernatant is used as the liquid composition D.

Table 2 shows physical properties of the liquid compositions A to D measured by the following methods, and evaluation results evaluated as follows.

(1) Counter Ion Equivalence

The liquid compositions A to D are respectively subjected to centrifugation (13,000 rpm, 3 hours) to remove solid matter, and filtered through a membrane filter (pore size: 0.2 μm) to use the filtered solutions as samples for analysis. The ionic equivalence of counter ions to the alumina hydrate in the liquid composition was determined for each sample, determining concentrations of anionic ions by ionic chromatography using Dionex DX-320 and Dionex 2000/SP (manufactured by Dionex Co.).

(2) Average Particle Size of Fine Particles

The liquid compositions A to D were respectively diluted with ion exchanged water to a solid particle concentration of 0.1%, and dispersed for 5 minutes by using an ultrasonic washer. After that the scattering strength was measured by using an electrophoretic light scattering photometer (ELS-8000, Otsuka Denshi K.K., liquid temperature: 25° C.). Average particle size was determined by cumulant analysis method from the above-obtained scattering strength data using a software for the photometer.

(3) pH

The pH of the liquid compositions was determined by using a pH meter (manufactured by Horiba Seisakusho Co., Ltd.; Casternee pH meter D-14) at a liquid temperature of 25° C.

The zeta-potential was measured by a zeta-potential measurement apparatus (BI-ZETA plus, manufactured by Brookhaven Co., liquid temperature: 20° C., acrylic cell) using samples of liquid compositions A to D dispersed in ion-exchanged water so as to make the concentration of the solid matter 0.1%.

(5) Storability in Tank

Each of the liquid compositions A to D was put in tanks for an ink-jet printer (BJF8500(trade name) manufactured by Canon Inc.) and left standing at 5° C. and 60° C. for one month in incubators. After incubation, respective liquid compositions in the ink tanks were evaluated for the physical propertiesejectability from the recording head when the ink tank was fitted to the ink-jet printer. The standard of the evaluation in the physical properties and ejectability was as follows.

A: Thixotropy was not developed in the tank and fluidity and ejection stability were both good.

B: Thixotropy was developed in the tank and the ejection stability was poor.

(6) Intermittent Ejectability

Tanks filled with respective liquid compositions A to D were mounted on the recording apparatus similar to that shown in FIG. 1 in turn, and the intermittent ejectability under conditions of 25° C. and 60% RH was observed. Specifically, as the ink-jet printer, BJF8500 (trade name; manufactured by Canon Inc.) was used, and as the tank, a tank for black ink was used. After the liquid composition was ejected from the recording head (orifice) to form dots on an OHP sheet, ejection was stopped for various periods of time, and then started again to form a dot on the OHP sheet. The longest pause period that allowed formation of the dot similar to those formed before pause was used for evaluation of the intermittent ejectability.

(7) Clogging

A tanks filled with the respective liquid compositions were mounted on the recording head of an ink-jet printer similar to that shown in FIG. 3 in turn, and detached from the recording apparatus of FIG. 1, and the head was left standing for 2 weeks at 35° C. in a dry incubator. Specifically, the liquid composition A was filled to a tank for an ink-jet printer (BJF8500 (trade name) manufactured by Canon Inc.), and the tank was fitted to the ink-jet printer by attaching it to the recording head of the ink-jet printer. After confirming that all the nozzles of the recording head worked, the recording head with the tank was detached from the ink-jet printer, and left to stand for 2 weeks at 35□ under dry condition. The head was mounted on the recording apparatus again, and the suction number required for solving clogging in the recording head was counted to make evaluation on the basis of the following criterion. As to the liquid compositions B–D, the same evaluation test was conducted respectively.

AA: Clogging was solved with suction number of 2 or less,
A: Clogging was solved with suction number of 34.
B: Clogging was not solved with suction number of 5 ore more.

(8) Pore Radius and Pore Volume

Samples were pretreated as describe later and then set in a cell and vacuum-degassed at 120° C. for 8 hours. The pore radius distribution and the pore volume of each liquid composition were measured by a nitrogen adsorption and desorption method using an Omni-sorb 1 manufactured by Kanta Chrome Co. The pore radius distribution and the pore volume were computed according to the method of Barrett, et. al. (J. Am. Chem. Soc., Vol. 73, 373, 1951).

(1) the liquid composition is dried at 120° C. for 10 hours in atmosphere to evaporate most of the solvent;
(2) the dried sample is baked at a temperature rising from 120° C. to 700° C. over one hour and then at 700° C. for three hours;
(3) after burning, the sample is gradually cooled to normal temperature and powdered by grinding in an agate mortar.

TABLE 2

Physical properties and evaluation results of liquid compositions A to D

| | Liquid composition | | | |
|---|---|---|---|---|
| | A | B | C | D |
| Ionic equivalence (meq/l) | 36.8 | 27.5 | 2.1 | 0.35 |
| Average particle size (nm) | 65 | 80 | 95 | 150 |
| pH | 3.5 | 3.9 | 4.7 | 5.2 |
| Zeta potential (mV) | 36 | 41 | 39 | 35 |
| Stability in tank | A | A | A | A |
| Intermittent ejection stability (sec) | 10 | 13 | 13 | 9 |
| Clogging | A | AA | AA | A |
| Pore volume (1) (ml/g) | 0.34 | 0.65 | 0.81 | 0.96 |
| Pore volume (2) (ml/g) | 0.34 | 0.64 | 0.80 | |
| Pore volume (3) (ml/g) | 0.001 | 0.003 | 0.003 | 0.01 |
| Pore volume (4) (ml/g) | 0.003 | 0.012 | 0.011 | 0.15 |

Note:
pore volume (1): pore radius 3–30 nm
pore volume (2): pore radius 3–20 nm
pore volume (3): pore radius >30 nm
pore volume (4): pore radius >20 nm The following is the description of ink subsets 1 and 2 used in Examples and Comparative Examples of the invention.

Production of Ink Subset 1

To prepare Black dye ink Bk1, yellow dye ink Y1, magenta dye ink M1, and cyan dye ink C1, respective components shown below were mixed and sufficiently stirred to dissolve them, and each solution was filtered under pressure through Fluoropore filter with the pore size of 0.45 μm (trade name; manufactured by Sumitomo Electric Industries Ltd.). The combination of these dye inks was called ink subset 1.

Black ink Bk1

| | |
|---|---|
| C. I. Direct Black 195 | 2.5 parts |
| 2-pyrrolidone | 10 parts |
| glycerol | 5 parts |
| isopropyl alcohol | 4 parts |
| sodium hydroxide | 0.4 parts |
| water | 78.1 parts |

Yellow ink Y1

| | |
|---|---|
| Project Fast Yellow 2 (produced by Zeneca Co.) | 2.0 parts |
| C. I. Direct Yellow 86 | 1.0 parts |
| thiodiglycol | 8 parts |
| ethylene glycol | 8 parts |
| acetylenol EH (produced by Kawaken Chemicals Co.) | 0.2 parts |
| isopropyl alcohol | 4 parts |
| water | 76.8 parts |

Magenta ink M1

| | |
|---|---|
| Project Fast Magenta 2 (produced by Zeneca Co.) | 3 parts |
| glycerol | 7 parts |
| urea | 7 parts |
| acetylenol EH (produced by Kawaken Chemicals Co.) | 0.2 parts |
| isopropyl alcohol | 4 parts |
| water | 78.8 parts |

Cyan ink C1

| | |
|---|---|
| C. I. Direct Blue 199 | 3 parts |
| ethylene glycol | 7 parts |
| diethylene glycol | 10 parts |
| acetylenol EH (produced by Kawaken Chemicals Co.) | 0.3 parts |
| water | 79.7 parts |

Production of Ink Subset 2

As shown below, a pigment dispersion was prepared, and using the pigment dispersion, black pigment ink Bk2 was prepared. Similarly, yellow pigment ink Y2, magenta pigment ink M2, and cyan pigment ink C2 were prepared. Combination of these pigment inks was called Ink subset 2.

Black ink Bk2

Production of a pigment dispersion

| | |
|---|---|
| styrene-acrylic acid-ethyl acrylate copolymer (acid value 140, the weight average molecular weight 5,000) | 1.5 parts |
| monoethanolamine | 1.0 parts |
| diethylene glycol | 5.0 parts |
| ion-exchanged water | 81.5 parts |

The above components were mixed and heated in a water bath at 70° C. to completely dissolve the resin component. The obtained solution was further mixed with 10 parts of carbon black (a new experimental product) (MCF 88, produced by Mitsubishi Kasei Corporation) and 1 part of isopropyl alcohol and pre-mixed for 30 minutes and then subjected to dispersion treatment under the following conditions:

a dispersing apparatus: a sand grinder (manufactured by Igarashi Kikai K.K.)
a pulverization medium: zirconium beads, 1 mm diameter the filling ratio of the pulverization medium: 50% (by volume ratio)
pulverization duration: 3 hours Then the resulting solution was subjected to centrifugal separation treatment (12,000 rpm., for 20 minutes) to remove coarse particles, thereby a dispersion was prepared.

Production of black ink Bk 2

Using thus-obtained pigment dispersion, the following components were mixed to produce an ink containing the pigment and named as the black ink Bk2:

| | |
|---|---|
| the foregoing pigment dispersion | 30.0 parts |
| glycerol | 10.0 parts |
| ethylene glycol | 5.0 parts |
| N-methylpyrrolidone | 5.0 parts |
| ethyl alcohol | 2.0 parts |
| ion-exchanged water | 48.0 parts |

Yellow Ink Y2

The pigment-containing yellow ink Y2 was produced in the same manner as with the black ink Bk2 production, except that Pigment Yellow 74 was used in place of the carbon black MCF 88.

Magenta Ink M2

The pigment-containing magenta ink M2 was produced in the same manner as with the black ink Bk2 production, except that Pigment Red 7 was used in place of the carbon black MCF 88.

Cyan Ink C2

The pigment-containing cyan ink C2 was produced in the same manner as with the black ink Bk2 production, except that Pigment Blue 15 was used in place of carbon black MCF 88.

Example 1 to Example 8

Printing was carried out using the liquid compositions A, B, C and D, and color inks of ink subset 1 (Bk1, Y1, M1, and C1), and ink subset 2 (Bk2, Y2, M2, and C2) in the combinations as shown in Table 2.

TABLE 3

| Example | Ink subset | Liquid composition |
|---|---|---|
| 1 | 1 | A |
| 2 | 1 | B |
| 3 | 1 | C |
| 4 | 1 | D |
| 5 | 2 | A |
| 6 | 2 | B |
| 7 | 2 | C |
| 8 | 2 | D |

In Examples 1 to 8, color images were formed on PPC paper (produced by Canon Inc.) using one of combinations of liquid compositions A to D and ink subsets 1 and 2. For printing, an ink-jet recording apparatus similar to that shown in FIG. 1 provided with five recording heads as shown in FIG. 3 was used. Specifically, as the ink-jet printer, modified version of BJF8500 (trade name, manufactured by Canon Inc.) was prepared, the liquid composition and the inks of the respective Ink subset were filled to corresponding tanks for the ink-jet printer, and the tanks were fitted to the ink-jet printer. Then ink jet color recording was performed with the ink-jet printer. At that time, the liquid composition was applied to the recording paper before the ink was applied.

Practically, printing was carried out by 3-pass fine printing in which the printing region was scanned three times. At that time, each liquid composition was applied to the position corresponding to a pixel to which any one of yellow, magenta, cyan and black inks to be applied. That is, the logical sum of the printing data for yellow, magenta, cyan and black in each pass was employed as the datum for application of the liquid compositions. The type of the fine mask employed for the fine printing is not specifically limited and any known technique can be applicable. Thus, detailed description is omitted.

The recording heads used here operate at a recording density of 600 dpi, and the operation condition was 9.6 kHz of operation frequency. For yellow, magenta, and cyan inks and the liquid composition, heads that eject 15 ng per dot were used, and for black ink a head that ejects 30 ng per dot.

The same recording conditions were used for Examples and Comparative Examples.

Comparative Example 1 and Comparative Example 2

Printing was carried out using only the ink subsets 1 and 2, as shown the following Table 4.

TABLE 4

| Comparative Example | Ink subset | Liquid composition |
|---|---|---|
| 1 | 1 | None |
| 2 | 2 | None |

Recording was carried out in the same recording conditions as in Examples 1 to 8.

<Evaluation Methods and Evaluation Standards>

Recorded imaged formed in Examples 1 to 8 and Comparative Examples 1 and 2 were evaluated according to the following evaluation methods and evaluation standards. The results are shown in Table 4.

Evaluation Method for a Recorded Image (1) Coloring Properties

A RGB color chart of a highly fine XYZ, CIELAB RGB standardized image (SHIPP) (ed. Highly Fine Standardized Image Formation Committee; published by Image Electronic Soc.) was printed using a printer and the liquid composition and ink subsets using the same image processing conditions, and the printed color charts were subjected to colorimetry. Colorimetry was carried out 24 hours after printing, using GRETAG Spectrolino (trade name) under conditions of light source: D50 and visual field: 2°. The evaluation of the coloring properties was carried out by computing the three-dimensional extension of the color distribution (hereinafter, referred to as color gamut volume) according to the method described in the technical manual of the above reference and comparing the results. The color gamut volume of the formed image was compared to that of the printed image formed using only the ink subsets (Comparative Examples 1 or 2), and the ratio was classified according to the following evaluation standards.

AAA: the ratio of color gamut volume is not less than 1.7
AA: the ratio of color gamut volume is 1.5 or more and less than 1.7
A: the ratio of color gamut volume is 1.4 or more and less than 1.5
BB: the ratio of color gamut volume is 1.2 or more and less than 1.4
B: the ratio of color gamut volume is 1.0 or more and less than 1.2
C: the ratio of color gamut volume is less than 1.0

At the same time, an image was formed with the ink subset 1 on coat paper (trade name: Color BJ paper LC-101, produced by Canon Inc.) using an ink-jet printer, and the color gamut volume was compared with that of the printed matter of Comparative Example 1. The ratio was 1.3.

(2) Evenness

After solid images of secondary colors, i.e. red, blue and green, colors were printed, the resultant solid images were evaluated as to white haze and color irregularities with naked eye The colors with especially inferior evenness were picked up as the evaluation objects. The evaluation standards were as follows:

A: white haze and color irregularity were scarcely observed;
B: although white haze and color irregularity were slightly observed along the fibers of the paper, the degree was within the practically acceptable level; and
C: white haze and color irregularity were noticeably observed along the fibers of the paper.

(3) Stripe-Like Irregularity (Banding)

After solid images of secondary color, i.e. red, blue, and green were printed, the resultant solid images were evaluated as to stripe-like irregularities, so-called "banding" with naked eye. The color images having especially inferior banding were picked up as the evaluation objects. The evaluation standards were as follows:

A: banding was scarcely observed;
B: although banding was slightly observed for every head scanning, the degree was within the practically acceptable level; and
C: banding were noticeably observed for every head scanning.

(4) Texture

Solid images of yellow, magenta, cyan, and black colors were printed with or without the liquid composition and inks of respective colors using the foregoing printer. The texture of the recording medium was evaluated with eye observation. The evaluation standards were as follows:

A: no disharmony was observed in both of the printed parts and non-printed parts and the texture of plain paper was conserved as it was;
B: the printed parts and the non-printed parts had different texture from each other or the recorded medium entirely had different texture from that of the plain paper.

TABLE 5

|  | Coloring property | Evenness | Banding | Texture |
| --- | --- | --- | --- | --- |
| Example 1 | AA | A | A | A |
| Example 2 | AAA | A | A | A |
| Example 3 | AAA | A | A | A |
| Example 4 | AA | A | A | A |
| Example 5 | AAA | A | A | A |
| Example 6 | AAA | A | A | A |
| Example 7 | AAA | A | A | A |
| Example 8 | AA | A | A | A |
| Comparative Example 1 | B | C | A | A |
| Comparative Example 2 | B | C | A | A |

Examples 9 to 15

In order to examine the influence of the type of the recording medium on the image quality, images were formed using the liquid composition C and four color inks of Ink subset 1 on 7 types of plain paper in the same manner as in the above examples. These plain papers are widely sold under the trade names listed below. The images were evaluated according to the above described evaluation standards. The obtained results are shown in Table 6.

Recording Media
1) produced by Canon Inc.: PB paper
2) produced by Canon Inc.: Brilliant White Paper
3) produced by Union Camp Co.: Great White Ink Jet
4) produced by Hammermill Co.: Jet Print
5) produced by Xerox Co.: Xerox 4024
6) produced by Hewlett Packard Co.: Bright White InkJet Paper
7) produced by Aussdat Ray Co.: Ray Jet

TABLE 6

| Example | Recording medium | Coloring property | Evenness | Banding | Texture |
| --- | --- | --- | --- | --- | --- |
| 9 | 1) | AAA | A | A | A |
| 10 | 2) | AAA | A | A | A |
| 11 | 3) | AAA | A | A | A |
| 12 | 4) | AAA | A | A | A |
| 13 | 5) | AAA | A | A | A |
| 14 | 6) | AAA | A | A | A |
| 15 | 7) | AAA | A | A | A |

According to the results of Examples 9 to 15 shown in Table 5, it was confirmed that the obtained images were satisfactory in all of coloring properties, evenness, banding, and texture, regardless of the types of the recording medium.

As described above, according to the invention, provided is a liquid composition capable of obtaining excellent coloring property and color evenness; and also provided are ink sets, a method for forming colored portions on object recording media, and an ink-jet recording apparatus which are all capable of providing ink-jet recording images on plain paper with the coloring property and the color evenness as excellent as those of images on coat paper for ink-jet printing while leaving the texture of the plain paper, with little stripe-like unevenness for mat image parts, still preserving paper texture. Moreover, the liquid composition is excellent in storage stability, intermittent ejectability from the recording head and clogging resistance in the head.

What is claimed is:

1. A liquid composition for forming a colored portion on a recording medium together with an anionic or cationic water-based ink containing a coloring material, comprising a solvent, and fine particles in a dispersion state, wherein the fine particles have a surface charge in a polarity opposite to the water-based ink, and the liquid composition further comprises ions whose polarity is opposite to that of the fine particles in an ionic equivalence of 0.1–40 meq/l.

2. The liquid composition according to claim 1, wherein the ionic equivalence is in a range of 1–30 meq/l.

3. The liquid composition according to claim 1, wherein the fine particles are aspherical.

4. The liquid composition according to claim 1, wherein the fine particles adsorb the colorant on the surface thereof while preventing the colorant from agglomerating when forming the colored portion.

5. The liquid composition according to claim 1, wherein the fine particles adsorb the colorant on the surface thereof while keeping the colorant in a monomolecular state.

6. The liquid composition according to claim 1, wherein the liquid composition has a zeta-potential of +5 to +90 mV.

7. The liquid composition according to claim 1, further containing an acid, and having a pH of 2 to 7.

8. The liquid composition according to claim 7, wherein the acid has a primary dissociation constant pKa of 5 or lower in water.

9. The liquid composition according to claim 1, wherein the liquid composition has a zeta-potential of −5 to −90 mV.

10. The liquid composition according to claim 1, further containing a base, and having a pH of 7 to 12.

11. The liquid composition according to claim 10, wherein the base has a primary dissociation constant pKb of 5 or lower in water.

12. An ink set comprising an ink and a liquid composition respectively, the ink being an anionic or cationic water based ink, and the liquid composition comprising a solvent, and fine particles in a dispersion state, wherein the fine particles have a surface charged in a polarity opposite to the water-based ink and wherein the liquid composition further comprises ions whose polarity is opposite to that of the fine particles in an ionic equivalence of 0.1–40 meq/l.

13. The ink set according to claim 12, comprising at least one ink as the ink selected from the group consisting of yellow ink, magenta ink, cyan ink, black ink, red ink, blue ink and green ink.

14. The ink set according to claim 12, comprising a yellow ink, a magenta ink, and a cyan ink as the ink.

15. The ink set according to claim 12, comprising a yellow ink, a magenta ink, a cyan ink, and a black ink as the ink.

16. The ink set according to claim 12, wherein the ink is anionic and a zeta-potential of the liquid composition is +5 to +90 mV.

17. The ink set according to claim 12, wherein the ink is anionic, and the liquid composition contains an acid and has a pH of 2 to 7.

18. The ink set according to claim 17, wherein the acid in the liquid composition has a primary dissociation constant pKa of 5 or lower in water.

19. The ink set according to claim 12, wherein the ink is cationic, and the liquid composition has a zeta-potential of −5 to −90 mV.

20. The ink set according to claim 12, wherein the ink is cationic and the liquid composition contains a base, and has a pH of 7 to 12.

21. The ink set according to claim 20, wherein the base in the liquid composition has a primary dissociation constant pKb of 5 or lower in water.

22. The ink set according to claim 12, wherein the ink is anionic and contains an anionic compound.

23. The ink set according to claim 22, wherein the anionic compound is a water-soluble dye having an anionic group.

24. The ink set according to claim 22, wherein the anionic compound is a pigment having an anionic group on the surface thereof.

25. The ink set according to claim 22, wherein the ink contains a pigment and an anionic compound that is a dispersant for the pigment.

26. The ink set according to claim 12, wherein the ink is cationic and contains a cationic compound.

27. A method for forming a colored portion on a recording medium, comprising the steps of:
(i) applying an ink containing a coloring material to a recording medium; and
(ii) applying a liquid composition of claim 1 to the recording medium.

28. The method of claim 27, wherein the step (ii) is conducted prior to the step (i).

29. The method according to claim 27, wherein the step (i) is conducted twice, and the step (ii) is conducted therebetween.

30. The method according to claim 27, wherein in the step (i) the ink is applied to the recording medium by an ink-jet recording method in which the ink is ejected from an orifice in response to a recording signal.

31. The method according to claim 30, wherein the ink-jet recording method is a method for ejecting the ink by applying heat energy to the ink.

32. The method according to claim 27, wherein in the step (ii) the liquid composition is applied to the recording medium by an ink-jet recording method in which the liquid composition is ejected from an orifice in response to a recording signal.

33. The method according to claim 32, wherein the ink-jet recording method is a method for ejecting the liquid composition by applying heat energy to the liquid composition.

34. An ink-jet recording apparatus comprising an ink container containing an ink comprising a coloring material, and a liquid composition container containing the liquid composition of claim 1, and an ink-jet head for ejecting the ink and the liquid composition respectively.

35. The ink-jet recording apparatus according to claim 34, wherein the ink-jet head is a thermal ink-jet head for ejecting a liquid by applying heat energy to the liquid.

36. The liquid composition according to claim 1, wherein the fine particles adsorb the colorant on the surface thereof or bind the colorant to the surface thereof when the liquid composition and the ink are brought into contact with each other in a liquid state, the adsorbed or bound colorant on or to the surface of the fine particles being in the same molecular state as that of the colorant in the ink.

37. The liquid composition according to claim 3, wherein the particle size of the fine particles is 150 nm or less.

* * * * *

UNITED STATES PATENT AND TRADEMARK OFFICE
CERTIFICATE OF CORRECTION

PATENT NO. : 6,719,420 B2
DATED : April 13, 2004
INVENTOR(S) : Hiroshi Tomioka et al.

It is certified that error appears in the above-identified patent and that said Letters Patent is hereby corrected as shown below:

Column 1,
Line 54, "followings" should read -- following --.

Column 3,
Line 24, "for immobilize" should read -- for immobilizing the fine --.
Line 38, "this" should read -- these --.

Column 4,
Line 34, "provide" should read -- provided --.
Line 60, "compositioncontainer" should read -- composition container --.

Column 6,
Line 49, "contact" should read -- contact with --.
Line 54, "partcan" should read -- part can --.

Column 7,
Line 13, "used" should read -- there was used --.
Line 31, "1M" should read -- IM --.
Line 51, "it" should read -- there --.
Line 62, "of" should be deleted.

Column 8,
Line 24, "1M" should read --1M --.
Line 28, "1S in FIG. 11" should read -- IS in FIG. 13 --.

Column 9,
Line 45, "as above" should read -- as --.

Column 10,
Line 7, "are" should read -- is --.

Column 11,
Line 13, "to close" should read -- close to --.

Column 12,
Line 28, "each" should read -- from each --.

Column 13,
Line 31, "because with" should read -- the reason is that maintaining --.
Line 52, "is" should read -- are --.

UNITED STATES PATENT AND TRADEMARK OFFICE
CERTIFICATE OF CORRECTION

PATENT NO.    : 6,719,420 B2
DATED         : April 13, 2004
INVENTOR(S)   : Hiroshi Tomioka et al.

It is certified that error appears in the above-identified patent and that said Letters Patent is hereby corrected as shown below:

Column 14,
Line 12, "the" should read -- for the --.
Line 44, "includes" should read -- include --.

Column 15,
Line 32, "=liquid" should read -- liquid --.

Column 16,
Line 33, "of" should be deleted.

Column 21,
Line 48, "is" should read -- are --.

Column 22,
Line 33, "an" should be deleted.

Column 23,
Line 12, "is" should read -- are --.

Column 24,
Line 21, "of" should be deleted.

Column 28,
Line 65, "it" should read -- there --.

Column 31,
Lines 1 and 17, "an" should read -- a --.

Column 32,
Lines 16 and 18, "be" should read -- may be --.

Column 33,
Line 28, "an" should be deleted.

Column 34,
Line 25, "comprise" should read -- recording medium compromises --.

UNITED STATES PATENT AND TRADEMARK OFFICE
CERTIFICATE OF CORRECTION

PATENT NO. : 6,719,420 B2
DATED : April 13, 2004
INVENTOR(S) : Hiroshi Tomioka et al.

It is certified that error appears in the above-identified patent and that said Letters Patent is hereby corrected as shown below:

Column 35,
Line 31, "has" should read -- have --.
Line 45, "transmit" should read -- transmitting --.
Line 46, "head" should read -- heads --.
Line 51, "figures," should read -- figure, --.

Column 36,
Line 1, "flat" should read -- be flat --.
Line 66, "are" should read -- , which are --.

Column 37,
Line 4, "s" should read -- a --.
Lines 19 and 22, "describe" should read -- described --.
Line 33, "each" should read -- each of the --.
Line 40, "as" should read -- so --.
Line 41, "(run" should read -- (is made to carry --.

Column 38,
Line 15, should be deleted.
Line 31, "to wipe" should read -- the wiping of --.

Column 39,
Line 10, "separated" should read -- separated from --.
Line 13, "each" should read -- from each --.
Line 22, "waster" should read -- waste --.
Line 27, "to contain" should read -- and contained --.
Line 52, "is reacts to" should read -- reacts with --.

Column 40,
Line 9, "detachably" should read -- detachably mountable --.
Line 19, "as" should read -- so --.
Line 20, "is" should be deleted.
Line 21, "contained" should be deleted.
Line 45, "he reference numeral 4" should read -- the reference numeral 4 denotes --.
Line 55, "flat" should read -- be flat --.

Column 41,
Line 1, "1BB" should read -- 1BB are arranged --.
Line 3, "is that to discharge" should read -- discharges --.
Line 6, "EBB" should read -- 1BB --.
Line 63, "a" should read -- at a --.

UNITED STATES PATENT AND TRADEMARK OFFICE
CERTIFICATE OF CORRECTION

PATENT NO. : 6,719,420 B2
DATED : April 13, 2004
INVENTOR(S) : Hiroshi Tomioka et al.

It is certified that error appears in the above-identified patent and that said Letters Patent is hereby corrected as shown below:

Column 42,
Line 9, "Wiping" should read -- When wiping --.

Column 43,
Line 8, "measured" should read -- measured in --.

Column 44,
Line 57, "properties ejectability" should read -- properties and ejectability --.

Column 45,
Line 13, "A tanks" should read --Tanks --.
Line 24, "35☐" should read -- 35°C --.
Line 32, "34." should read -- 3 - 4. --.
Line 33, "ore" should read -- or --.
Line 36, "describe later" should read -- described below --.

Column 48,
Line 30, "to" should read -- was to --.
Line 60, "imaged" should read -- images --.

Column 49,
Line 36, "eye The" should read -- eye.  The --.
Line 56, "were" should read -- was --.

Signed and Sealed this

Thirty-first Day of August, 2004

JON W. DUDAS
*Director of the United States Patent and Trademark Office*